US008760521B2

(12) United States Patent
Medeiros et al.

(10) Patent No.: US 8,760,521 B2
(45) Date of Patent: Jun. 24, 2014

(54) CALIBRATION OF LARGE CAMERA NETWORKS

(75) Inventors: Henry Ponti Medeiros, West Lafayette, IN (US); Johnny Park, Lafayette, IN (US); Avinash Kak, West Lafayette, IN (US); Hidekazu Iwaki, Tokyo (JP)

(73) Assignees: Purdue Research Foundation, West Lafayette, IN (US); Olympus Corporation, Tokyo (JP)

( * ) Notice: Subject to any disclaimer, the term of this patent is extended or adjusted under 35 U.S.C. 154(b) by 186 days.

(21) Appl. No.: 13/201,064

(22) PCT Filed: May 14, 2010

(86) PCT No.: PCT/US2010/034937
§ 371 (c)(1),
(2), (4) Date: Aug. 11, 2011

(87) PCT Pub. No.: WO2010/132791
PCT Pub. Date: Nov. 18, 2010

(65) Prior Publication Data
US 2011/0310255 A1 Dec. 22, 2011

Related U.S. Application Data

(60) Provisional application No. 61/178,727, filed on May 15, 2009.

(51) Int. Cl.
H04N 17/00 (2006.01)
H04N 17/02 (2006.01)
H04B 17/02 (2006.01)
G06T 7/00 (2006.01)
H04N 5/217 (2011.01)
H04N 9/093 (2006.01)

(52) U.S. Cl.
CPC .............. *H04N 17/002* (2013.01); *H04B 17/02* (2013.01); *G06T 7/0018* (2013.01); *H04N 5/217* (2013.01); *H04N 9/093* (2013.01)
USPC ............ 348/187; 348/188; 356/615; 709/224

(58) Field of Classification Search
CPC .... H04N 17/002; H04N 17/02; G06T 7/0018; H09N 9/093
See application file for complete search history.

(56) References Cited

U.S. PATENT DOCUMENTS 7,020,701 B1 3/2006 Gelvin et al.
7,062,861 B2 6/2006 O'Mahony et al.
(Continued)

OTHER PUBLICATIONS

International Searching Authority, "International Search Report" for PCT/US2010/034937, Jul. 12, 2010, pp. 1-2.
(Continued)

*Primary Examiner* — Jefferey Harold
*Assistant Examiner* — Omer Khalid
(74) *Attorney, Agent, or Firm* — Barnes & Thornburg LLP

(57) ABSTRACT

The present disclosure relates to a sensor network including a plurality of nodes, each node having a directional sensor, a communication module, and a processor configured to receive local measurements of a calibration object from the directional sensor, receive additional measurements of the calibration object from neighboring nodes via the communication module, estimate an initial set of calibration parameters in response to the local and additional measurements, receive additional sets of calibration parameters from neighboring nodes via the communication module, and recursively estimate an updated set of calibration parameters in response to the additional sets of calibration parameters. Additional systems and methods for calibrating a large network of camera nodes are disclosed.

32 Claims, 24 Drawing Sheets

(56) References Cited

U.S. PATENT DOCUMENTS

2006/0023073 A1    2/2006   Li et al.
2008/0255911 A1   10/2008   Khosla
2010/0073686 A1*   3/2010   Medeiros et al. ............. 356/615

OTHER PUBLICATIONS

International Searching Authority, "Written Opinion of the International Searching Authority" for PCT/US2010/034937, Jul. 12, 2010, pp. 1-6.

* cited by examiner

CALIBRATION OF LARGE CAMERA NETWORKS

CROSS REFERENCE TO RELATED APPLICATIONS

This application is a national stage entry of International Application No. PCT/US2010/034937, filed May 14, 2010, which claimed the benefit of U.S. Provisional Patent Application Ser. No. 61/178,727, filed on May 15, 2009. The entire disclosures of the foregoing references are incorporated herein by reference.

TECHNICAL FIELD

The present disclosure generally relates to the calibration of a directional sensor network. More particularly, the present disclosure relates to systems and methods for calibrating a large network of camera-based sensors.

BACKGROUND

Calibrating a network of directional sensors may be achieved using a number of techniques. One known technique for calibrating a network of camera-based sensors requires a single, centralized processor which receives image feature data from each of the sensors and then performs a minimization of calibration errors for the entire network. This single processor method is accurate when calibrating small networks (e.g., having less than 50 sensors) but is not suitable when scaled to larger networks (e.g., having more than 50 sensors).

A localization algorithm method for calibrating camera networks is described in Lee et al., "Collaborative Self-Localization Techniques for Wireless Image Sensor Networks," Proc. Asilomar Conf. on Signals, Sys., & Computers (2005), the entire disclosure of which is expressly incorporated by reference herein. This localization algorithm method basically estimates the location of a moving target and a camera node. The method selects two reference nodes to define an origin and a unit length. The method then finds the position and orientation of the sensors in the network with respect to the reference nodes. This localization algorithm method has been tested in two dimensional (2D) space using a very small network (i.e., five camera-based sensors).

A distributed localization algorithm method for calibrating camera networks is described in Mantzel et al., "Distributed Camera Network Localization," Proc. Asilomar Conf. on Signals, Sys., & Computers (2004), the entire disclosure of which is expressly incorporated by reference herein. This distributed localization algorithm method iteratively refines the localization estimates for each camera in the network. The method assumes that the image features required for localization have already been acquired and that the correspondences between the image features are known. This distributed localization algorithm allows for localization of a static network, but will not operate in a dynamic network where the image features required for localization are not already present.

An automated calibration protocol method for calibrating camera networks is described in Liu et al., "A Self-Calibration Protocol for Camera Sensor Networks," Technical Rep., Dept. Computer Sci., Univ. of Mass. (2005), the entire disclosure of which is expressly incorporated by reference herein. This automated calibration protocol method uses a calibration device that is equipped with a global positioning system (GPS) and a light emitting diode (LED). Camera position and orientation are calculated using data received from the calibration device and image coordinate data received from the camera. For each camera requiring calibration, the calibration device is placed in front of each camera by a user, and the data obtained from the device and the camera is used to calculate the position and orientation of the camera being calibrated.

A distributed calibration algorithm method for calibrating camera networks is described in Devarajan et al., "Distributed Metric Calibration of Large Camera Networks," Proc. Int'l Conf. on Broadband Networks (2004), the entire disclosure of which is expressly incorporated by reference herein. This distributed calibration algorithm method assumes that communication between any two cameras is possible within the network. Communication may be made through a wired network where each camera can communicate with any other camera or through a wireless network where each camera can only communicate with any camera within a wireless network range. The wireless communication embodiment assumes that all cameras within the network are within the wireless communication range.

A simultaneous localization and tracking method for calibrating camera networks is described in Funiak et al., "Distributed Localization of Networked Camera," Int'l Conf. on Info. Processing Sensor Networks 34-42 (2006), the entire disclosure of which is expressly incorporated by reference herein. This simultaneous localization and tracking method uses several ceiling mounted cameras to determine the positions of the cameras while determining the trajectory of a target object trajectory. This method considers only three extrinsic parameters (x, y, θ) of the camera. As the cameras are ceiling-mounted, the height above ground parameter (z) is essentially known by all cameras in the network prior to calibration The aforementioned calibration methods all have limitations, such as requiring human interaction during the calibration process or imposing constraints on the positioning of the cameras to satisfy calibration algorithm requirements, by way of example. Furthermore, these methods each require either significant computing capabilities to deal with the necessary data and calculations and/or powerful communication infrastructures in which each camera may communicate with any other camera. In other words, these conventional methods generally suffer from the so-called scalability problem of camera calibration. As the number of cameras increases in the network, the communication network traffic increases significantly due to the exchange of more information between pairs of cameras or between the central server and the cameras. At the same time, the computational tasks required for camera calibration also increase significantly. In addition, whenever any local changes in camera configurations become necessary, conventional calibration methods typically required the revision of calibration parameters for the entire network. The conventional approaches described above do not provide communication and computational efficiencies for large camera networks to overcome these challenges. Thus, these conventional calibration methods can only practically deal with relatively small sizes of camera network (e.g., having less than 50 cameras).

Additional calibration techniques and background principles are described in R. Hartley et al., Multiple View Geometry in Computer Vision (2004); O. Faugeras, Three-Dimensional Computer Vision (1993); P. Baker et al. "Calibration of a Multicamera Network," Proc. Omnidirectional Vision & Camera Networks (2003); S. Capkun et al., "GPS-Free Positioning in Mobile Ad-Hoc Networks," 5 Cluster Computing 157-66 (2002); A. Galstyan et al. "Distributed Online Localization in Sensor Networks Using a Moving Target," Proc. Int'l Symp. on Info. Processing Sensor Networks 61-70 (2004); R. Hartley, "In Defense of the Eight-Point Algorithm," 19 IEEE Transactions on Pattern Analysis & Machine Intelligence 580-93 (1997); R. Iyengar et al., "Scalable and Distributed GPS Free Positioning for Sensor Networks," Proc. IEEE Int'l Conf. on Comm. 338-42 (2003); M. Lourakis et al., "The Design and Implementation of a Generic Sparse Bundle Adjustment Software Package Based on the Levenberg-Marquardt Algorithm," Technical Rep. 340, Inst. Computer Sci. —FORTH (2004); H. Medeiros et al., "Online Distributed Calibration of a Large Network of Wireless Cameras Using Dynamic Clustering," ACM/IEEE Int'l Conf. on Distributed Smart Cameras (2008); M. Pollefeys et al., "Self-calibration and Metric Reconstruction in Spite of Varying and Unknown Intrinsic Camera Parameters," 32 Int'l J. Computer Vision 7-25 (1999); M. Rahimi et al., "Cyclops: In Situ Image Sensing and Interpretation in Wireless Sensor Networks," Proc. Int'l Conf. on Embedded Networked Sensor Sys. 192-204 (2005); C. Savarese et al., "Locationing in Distributed Ad-Hoc Wireless Sensor Networks," Proc. IEEE Int'l Conf. on Acoustics, Speech, & Signal Processing 2037-40 (2001); A. Savvides et al., "Dynamic Fine-Grained Localization in Ad-Hoc Networks of Sensors," Proc. Int'l Conf. on Mobile Computing & Networking 166-79 (2001); T. Svoboda et al., "A Convenient Multi-Camera Self-Calibration for Virtual Environments," 14 PRESENCE: Teleoperators & Virtual Env'ts 407-22 (2005); B. Triggs et al., "Bundle Adjustment—A Modern Synthesis," Vision Algorithms: Theory & Practice, Lecture Notes Computer Sci. 153-77 (2000); J. Weng et al., "Motion and Structure from Two Perspective Views: Algorithms, Error Analysis, and Error Estimation," 11 IEEE Transactions on Pattern Analysis & Machine Intelligence 451-76 (1989). The entire disclosures of each of the above listed references is expressly incorporated herein by reference. This listing is not intended as a representation that a complete search of all relevant prior art has been conducted or that no better reference than those listed above exist; nor should any such representation be inferred.

BRIEF SUMMARY

The present invention provides for the efficient calibration of a large camera network in terms of both communications and computations, as well as the robustness of any dynamic reconfiguration. In other words, the present invention solves the scalability problem of camera calibration. More specifically, when the number of cameras increases, the communications and computations required for camera calibration according to the present disclosure do not increase significantly. Additionally, when local changes in camera configurations occur, the revision of calibration parameters may be carried out within a local area of the network. The present invention comprises one or more of the features recited in the appended claims and/or the following features which, alone or in any combination, may comprise patentable subject matter.

According to one aspect, a method may include sensing a calibration object with a plurality of directional sensor nodes, exchanging measurement data regarding the calibration object between the plurality of directional sensor nodes, estimating an initial set of calibration parameters for each of the plurality of directional sensor nodes in response to the exchanged measurement data, exchanging the initial sets of calibration parameters between the plurality of directional sensor nodes, and estimating an updated set of calibration parameters for each of the plurality of directional sensor nodes in response to the exchanged initial sets of calibration parameters.

In some embodiments, the steps of estimating the initial set of calibration parameters and estimating the updated set of calibration parameters may be performed in a distributed manner by each of the plurality of directional sensor nodes. Sensing the calibration object with the plurality of directional sensor nodes may include simultaneously observing a calibration object having at least two distinctive features with a plurality of camera nodes.

In other embodiments, exchanging measurement data regarding the calibration object may include each of the plurality of directional sensor nodes broadcasting measurement data to and receiving measurement data from all of its one-hop communication neighbors. In still other embodiments, exchanging measurement data regarding the calibration object may include forming a dynamic cluster of directional sensor nodes and aggregating measurement data at a cluster head of the dynamic cluster. In such embodiments, the cluster head may perform the step of estimating an initial set of calibration parameters for each of the plurality of directional sensor nodes in the dynamic cluster after the cluster head leaves the dynamic cluster.

In some embodiments, estimating the initial set of calibration parameters for each of the plurality of directional sensor nodes may include determining a relative position vector and a corresponding covariance between each pair of directional sensor nodes having eight or more corresponding data points regarding the calibration object among the measurement data. Exchanging the initial sets of calibration parameters may include each of the plurality of directional sensor nodes broadcasting its set of calibration parameters to and receiving a set of calibration parameters from all of its one-hop communication neighbors. Estimating the updated set of calibration parameters for each of the plurality of directional sensor nodes may include refining the initial set of calibration parameters for each of the plurality of directional sensor nodes using recursive least squares.

In other embodiments, the method may further include adjusting the updated set of calibration parameters for each of the plurality of directional sensor nodes to conform to a global coordinate frame. Adjusting the updated set of calibration parameters for each of the plurality of directional sensor nodes may include dynamically aligning local coordinate frames of the plurality of directional sensor nodes to one another. In still other embodiments, the method may further include refining the updated sets of calibration parameters using a bundle adjustment scheme.

In some embodiments, the method may include performing the steps of exchanging the initial sets of calibration parameters and estimating an updated set of calibration parameters recursively until the respective directional sensor node achieves a predetermined level of calibration accuracy. The respective directional sensor node may achieve a predetermined level of calibration accuracy when the difference between two consecutively estimated sets of calibration parameters is less than a predetermined value. In some embodiments, the method may also include reporting to an operator that the respective directional sensor node has achieved a predetermined level of calibration accuracy. In such embodiments, the method may further include placing the calibration object in a viewing area of a directional sensor node that has not yet achieved the predetermined level of calibration accuracy.

According to another aspect, tangible, machine readable media may comprise a plurality of instructions that, in response to being executed, result in a plurality of directional sensor nodes performing any of the methods described above.

According to yet another aspect, a sensor network includes a plurality of nodes. Each node may have a directional sensor, a communication module, and a processor configured to receive local measurements of a calibration object from the directional sensor, receive additional measurements of the calibration object from neighboring nodes via the communication module, estimate an initial set of calibration parameters in response to the local and additional measurements, receive additional sets of calibration parameters from neighboring nodes via the communication module, and recursively estimate an updated set of calibration parameters in response to the additional sets of calibration parameters.

In some embodiments, the directional sensor of each of the plurality of nodes is a camera. In other embodiments, the communication module of each of the plurality of nodes is a wireless radio. In still other embodiments, the sensor network may further include a user interface configured to communicate with the plurality of nodes via their communication modules and display calibration information regarding the plurality of nodes. The user interface may include an indication of the level of calibration accuracy achieved by each of the plurality of nodes. The user interface may also include an indication of whether each of the plurality of nodes has achieved a predetermined level of calibration accuracy. In some embodiments, the user interface may include a graphical display illustrating relative positions and orientations of the plurality of nodes with respect to a global coordinate frame.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures, in which.

DETAILED DESCRIPTION OF THE DRAWINGS

Figure 1:
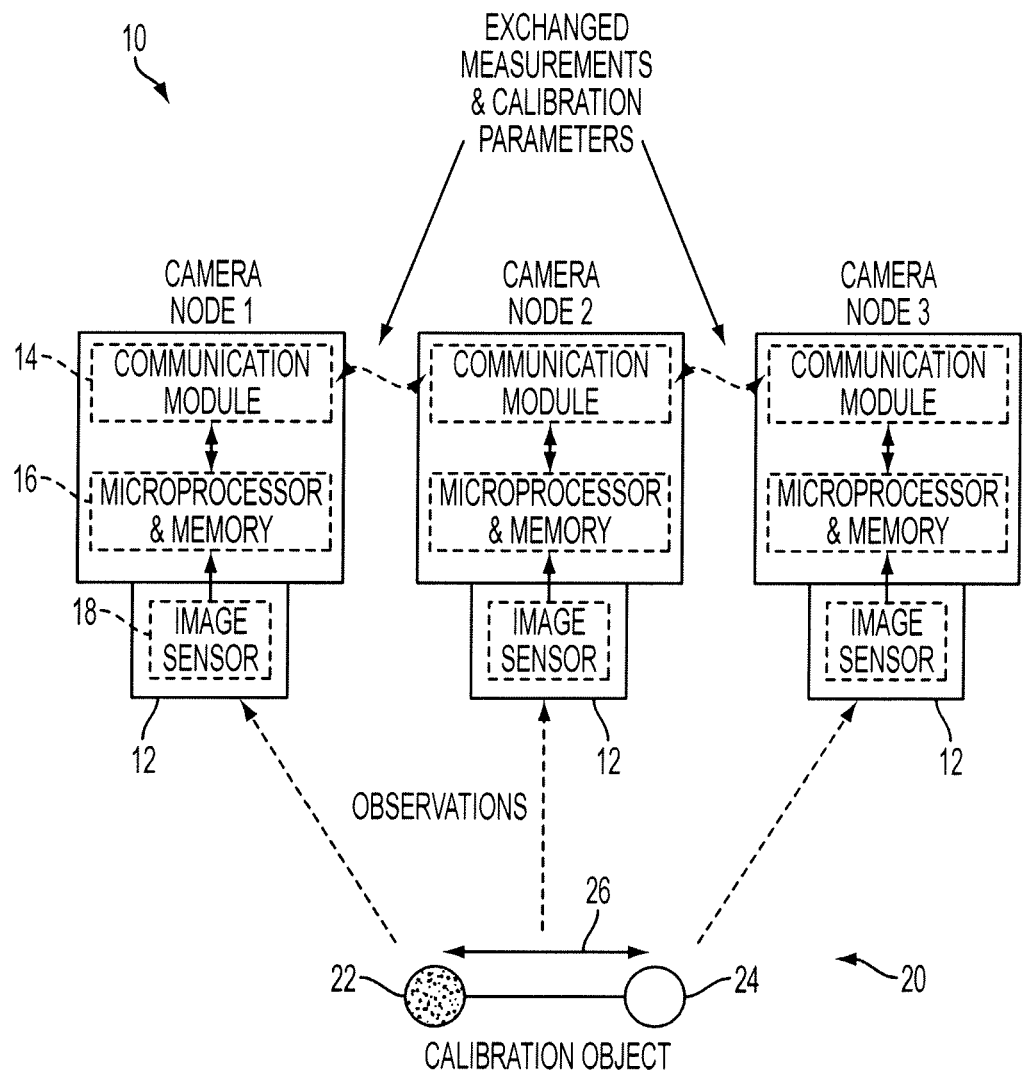
FIG. 1 illustrates an exemplary network including three camera nodes observing a calibration object.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but, on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices may be set forth in order to provide a more thorough understanding of the present disclosure. It will be appreciated, however, by one skilled in the art that embodiments of the disclosure may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

Embodiments of the disclosed systems and methods may be implemented in hardware, firmware, software, or any combination thereof. Embodiments of the disclosed systems and methods implemented in a directional sensor network may include one or more point-to-point interconnects between components and/or one or more bus-based interconnects between components. Embodiments of the disclosed systems and methods may also be implemented as instructions stored on a tangible, machine-readable medium, which may be read and executed by one or more processors. A tangible, machine-readable medium may include any mechanism for storing or transmitting information in a form readable by a machine (e.g., a processor). For example, a tangible, machine-readable medium may include read only memory (ROM), random access memory (RAM), magnetic disk storage, optical storage, flash memory, and/or other types of memory devices.

The present disclosure describes systems and methods for calibrating a large network of directional sensors using distributed algorithms. A first illustrative embodiment of these systems and methods uses a peer-to-peer distributed network approach. A second illustrative embodiment employs dynamic clustering of the directional sensors. A third illustrative embodiment evaluates the calibration accuracy of each camera and determines when to cease the calibration process. A fourth illustrative embodiment of the systems and methods utilizes a user interface to provide feedback regarding the calibration process. A fifth illustrative embodiment includes a calibration refinement step employing a bundle adjustment technique. A sixth illustrative embodiment involves an alternative, modular approach.

Each of the illustrative embodiments described herein uses a network 10 of individual, camera-based sensors 12 (i.e., "camera nodes"). Referring now to FIG. 1, each camera node 12 may illustratively include a communication module 14, a microprocessor and memory circuit 16, and an image sensor module 18. In other embodiments, a computing device external to the camera node 12 (typically including a microprocessor, memory, and communication circuitry) may receive and process the raw image data from the image sensor(s) 18. The image sensors 18 may illustratively include CCD cameras, CMOS cameras, and/or any other suitable alternatives. The communication module 14 may have wireless communications capabilities, wired communications capabilities, or both, so long as the neighboring camera nodes 12 of the wireless or wired network can be defined by communication links in terms of communication powers and geometry.

The image sensor 18 of each camera node 12 may capture a raw image and transmit the raw image to the associated microprocessor of the circuit 16. Each microprocessor of circuit 16 may then perform an series of tasks including, but not limited to, storing the image captured by the image sensor 18 in the memory of circuit 16, processing the stored image to generate analyzed data associated with any objects in the image, controlling the associated communication module 14 to transmit and receive information from neighboring camera nodes 12, and controlling overall functions of the camera nodes 12. Several of these tasks performed by the camera nodes 12 will be further described below with reference to FIGS. 7-15.

Figure 2A:
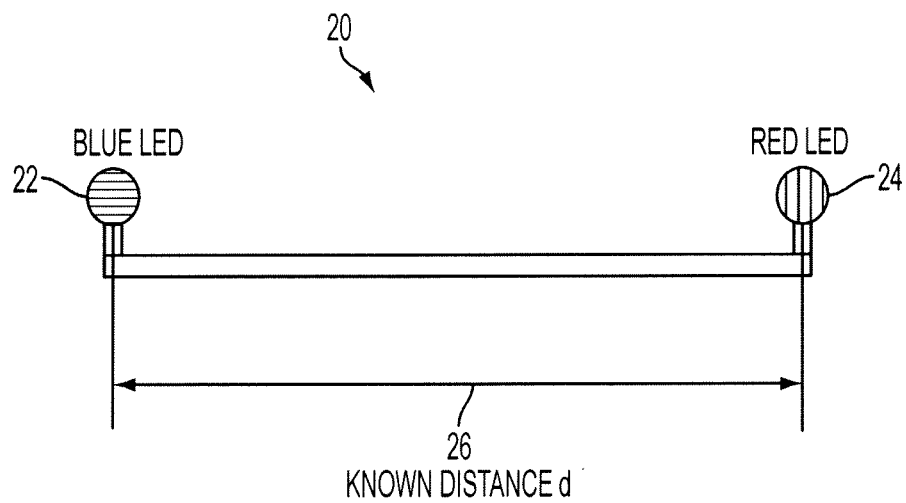
FIG. 2A illustrates one embodiment of a calibration object, having two distinctive features positioned a known distance from one another.
Figure 2B:
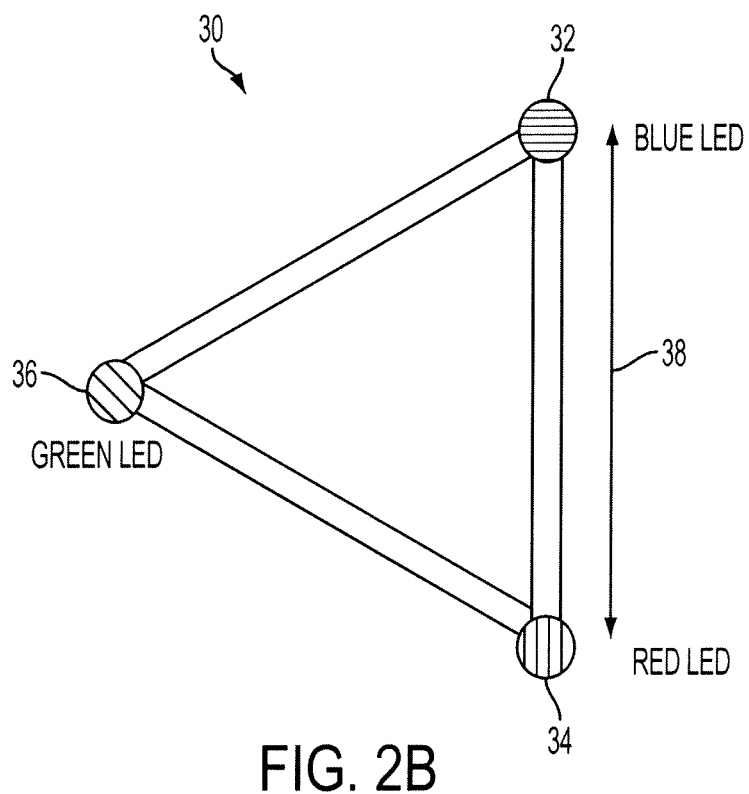
FIG. 2B illustrates another embodiment of a calibration object, having three distinctive features positioned known distances from one another.

A calibration object 20, which includes at least two distinctive features 22, 24 separated by a known distance 26, may be used for calibration of the camera nodes 12 in the network 10. As shown in FIG. 1, each camera node 12 may capture a raw image of the calibration object 20 which may then be processed by the microprocessor of circuit 16 to obtain image coordinates relating to the calibration object 20. The known distance 26 is used to compute a correct scale in each pairwise calibration of the camera nodes 12, as described below. As shown in FIG. 2A, one illustrative embodiment of the calibration object 20 includes a blue LED 22 (i.e., a first distinctive feature) and a red LED 24 (i.e., a second distinctive feature) positioned to lie a known distance 26 ($d$) from the blue LED 22. In another illustrative embodiment, shown in FIG. 2B, a calibration object 30 may include a blue LED 32 (i.e., a first distinctive feature), a red LED 34 (i.e., a second distinctive feature), and a green LED 36 (i.e., a third distinctive feature), each positioned to lie a known distance 38 from one another. It is contemplated that the distances 38 between features may be the same or different from one another in the embodiment of FIG. 2B.

It should be appreciated that, although the present disclosure assumes that each camera node 12 in the network 10 knows the intrinsic camera parameters of its image sensor 18 (e.g., focal length, principal points, distortion parameters, etc.), these intrinsic properties may alternatively be estimated by using corresponding image points between camera nodes 12. The intrinsic camera properties may be stored, for example, in the microprocessor and memory circuit 16 included within each camera node 12. Furthermore, the present disclosure also assumes that each camera node 12 is pre-programmed with knowledge regarding the calibration object 20. The process of calibrating the camera nodes 12 of a network 10 generally involves estimating the position and orientation of each, individual camera with respect to a world coordinate frame. Such parameters (i.e., position and orientation) are referred to in the present disclosure as "extrinsic camera parameters." When a camera is located in a three-dimensional (3D) space, the effective number of extrinsic camera parameters for each individual camera is six (i.e., the so-called six degrees of freedom.) A world coordinate frame may alternatively be defined either by selecting a representative camera node and defining the world coordinate frame as the coordinate frame of the selected camera node or by aligning the world coordinate frame with an existing world coordinate frame which has already been applied to the environment. The illustrative embodiments of the present disclosure utilize the former option in which the world coordinate frame coincides with the coordinate frame of a representative camera (e.g., camera node 1). It is contemplated that other embodiments may use the latter option to define a world coordinate frame, or global coordinate frame.

Figure 3:
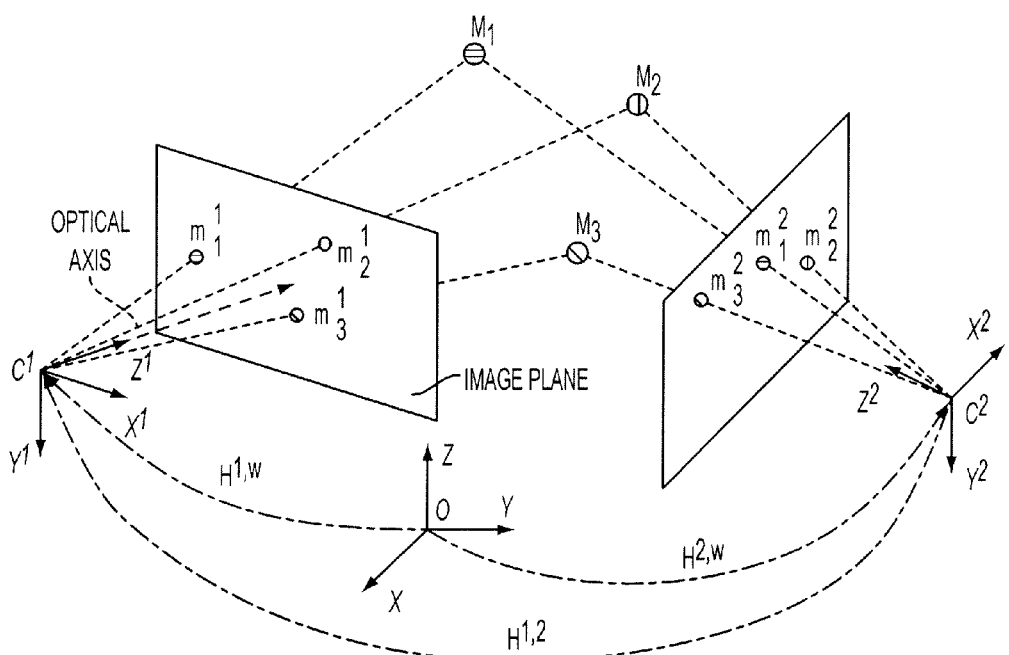
FIG. 3 illustrates the extrinsic camera parameters of two camera projection models with respect to a world coordinate frame.

The camera calibration process generally involves estimating how the coordinate frame of camera node i (the i-th camera coordinate frame, where i=1, 2, . . . , N and N is number of camera nodes 12 in the network 10) is related to the world coordinate frame, i.e. by estimating the position and orientation parameters of a transformation from the i-th camera coordinate frame to the world coordinate frame. An illustrative example, in which the world coordinate frame is defined by OXYZ, and the i-th camera coordinate frame is defined by $C^i X^i Y^i Z^i$, is shown in FIG. 3. Using ($x^i$, $y^i$, $z^i$) as the 3-D coordinates of a point in the i-th camera coordinate frame and ($x^w$, $y^w$, $z^w$) as the 3-D coordinates of the same point in the world coordinate frame, the relationship between ($x^w$, $y^w$, $z^w$) and ($x^i$, $y^i$, $z^i$) can be represented as:

$$\begin{bmatrix} x^w \\ y^w \\ z^w \end{bmatrix} = R^{w,i} \begin{bmatrix} x^i \\ y^i \\ z^i \end{bmatrix} + t^{w,i}, \qquad (1)$$

where $R^{w,i}$ represents the rotation matrix (containing rotational parameters of three degrees of freedom) and $t^{w,i}$ represents the translation vector (containing positional parameters of the remaining three degrees of freedom). Such a set of rotational parameters and positional parameters (six-dimensional parameters) are one example of "extrinsic camera parameters." It will be appreciated by those of skill in the art that, although the present disclosure utilizes the foregoing six-dimensional parameters to express the relationship between the world coordinate frame and the i-th camera coordinate frame, many possible variations of representing extrinsic camera parameters might be used. For example, if the camera nodes 12 were located in a constrained environment (e.g., with a constant height), the positional parameters may be represented by two-dimensional vectors of two degrees of freedom.

Returning to FIG. 3, in which OXYZ represents the world coordinate frame and $C^i X^i Y^i Z^i$ represents the coordinate frame of the i-th camera, the homogeneous coordinate vector of the j-th object point with respect to the world coordinate frame may be expressed as $M_j^w = [x_j^w, y_j^w, z_j^w, 1]^T$, and the homogeneous image coordinate vector that represents the j-th object measured in the i-th camera may be expressed as $m_j^i = [u_j^i, v_j^i, 1]^T$. The basic image projection equation states that $m_j^i$ is the projection of $M_j^w$ up to an unknown scale factor s:

$$sm_j^i = P^i M_j^w \quad (2),$$

where $P^i$ is the 3×4 projection matrix of the i-th camera. Equation 2 may be rewritten by further decomposing the projection matrix $P^i$:

$$sm_j^i = A^i [R^{i,w} | t^{i,w}] M_j^w \quad (3),$$

where $A^i$ is a 3×3 upper triangular matrix that encodes the intrinsic parameters of camera node i (e.g., focal length, principal point, etcetera) and $R^{i,w}$ and $t^{i,w}$ are, respectively, a 3×3 rotation matrix and a translation vector that describe the 3D transformation (or 3D displacement) from the world coordinate frame to the i-th camera coordinate frame.

A rotation matrix may be represented more compactly by a unit quaternion $q = [q_w, q_x, q_y, q_z]^T$, where $q_w = \sqrt{1 - q_x^2 - q_y^2 - q_z^2}$. A rotation matrix R corresponding to a unit quaternion q is given by:

$$R(q) = \begin{bmatrix} 1 - 2q_y^2 - 2q_z^2 & 2(q_x q_y - q_z q_w) & 2(q_x q_z + q_y q_w) \\ 2(q_x q_y + q_z q_w) & 1 - 2q_x^2 - 2q_z^2 & 2(q_y q_z - q_x q_w) \\ 2(q_x q_z - q_y q_w) & 2(q_y q_z + q_x q_w) & 1 - 2q_x^2 - 2q_y^2 \end{bmatrix}, \quad (4)$$

Therefore, the extrinsic calibration parameters of a camera node i may be expressed as:

$$p^{w,i} = \begin{bmatrix} q^{w,i} \\ t^{w,i} \end{bmatrix}, \quad (5)$$

where $q^{w,i}$ and $t^{w,i}$ are, respectively, a quaternion vector and a translation vector that describe the transformation from the i-th camera coordinate frame to the world coordinate frame. Similarly, the relative transformation parameters from the j-th camera to the i-th camera may be expressed as $p^{i,j}$. A 4×4 homogeneous transformation matrix H corresponding to a calibration parameter vector may be expressed as:

$$H(p^{w,i}) = \begin{bmatrix} R(q^{w,i}) & t^{w,i} \\ 0 & 1 \end{bmatrix}, \quad (6)$$

Finally, for each camera parameter $p^{i,j}$, the present disclosure denotes its corresponding covariance matrix as $\Sigma^{i,j}$. When measurement error is involved in the image measurement, it is possible to evaluate how much error is expected in the parameters calculated through the estimation process. The covariance matrix is often used to describe such an estimation error in the statistical sense.

Finding the relative position and orientation between a pair of cameras is a well-known problem in the field of computer vision. Assuming that n object points exist that are visible by two cameras (camera node 1 and camera node 2), the fundamental matrix F between the two cameras may be defined by the equation:

$$(m_j^2)^T F m_j^1 = 0, j = [1, n] \quad (7)$$

where j is the index to object points for j=1, 2, ..., n. Given at least eight pairs of matched image coordinates of the object points, the fundamental matrix F may be determined by solving Equation 7, as explained in Hartley et al. (cited above). The fundamental matrix F, along with each camera's intrinsic parameters (i.e., matrix A in Equation 3) may then be used to compute the relative position and orientation parameters $p^{j,i}$ between the j-th camera and the i-th camera up to an unknown scale (e.g., using the procedure described by Weng et al., cited above).

The more corresponding image measurements that are obtained by each pair of cameras, the more accurately Equation 7 can be solved and the more precisely the extrinsic camera parameters may be estimated. Collecting, and processing, a large number of measurements, however, requires large amounts of memory and computational power, which may well exceed the capabilities of camera nodes 12 in a large network 10. An online camera calibration method, i.e. one that allows the camera parameters to be computed as enough data is obtained and then to be refined as additional measurements are captured by the cameras, may overcome these challenges. In addition to determining the relative position and orientation of each pair of cameras in the network, the calibration should also determine the position and orientation of each camera with respect to a global coordinate frame (i.e., a world coordinate frame). While the former determination is essentially localized (i.e., each pair of cameras does not need information from other cameras to compute their respective parameters), the latter determination is centralized by its very nature. In other words, computing the relative position and orientation of each camera with respect to the global coordinate frame requires each camera in the network to be aware of the global reference frame. To maintain a scalable approach to camera calibration, the present disclosure implements distributed algorithms to address the global calibration issue.

Figure 4:
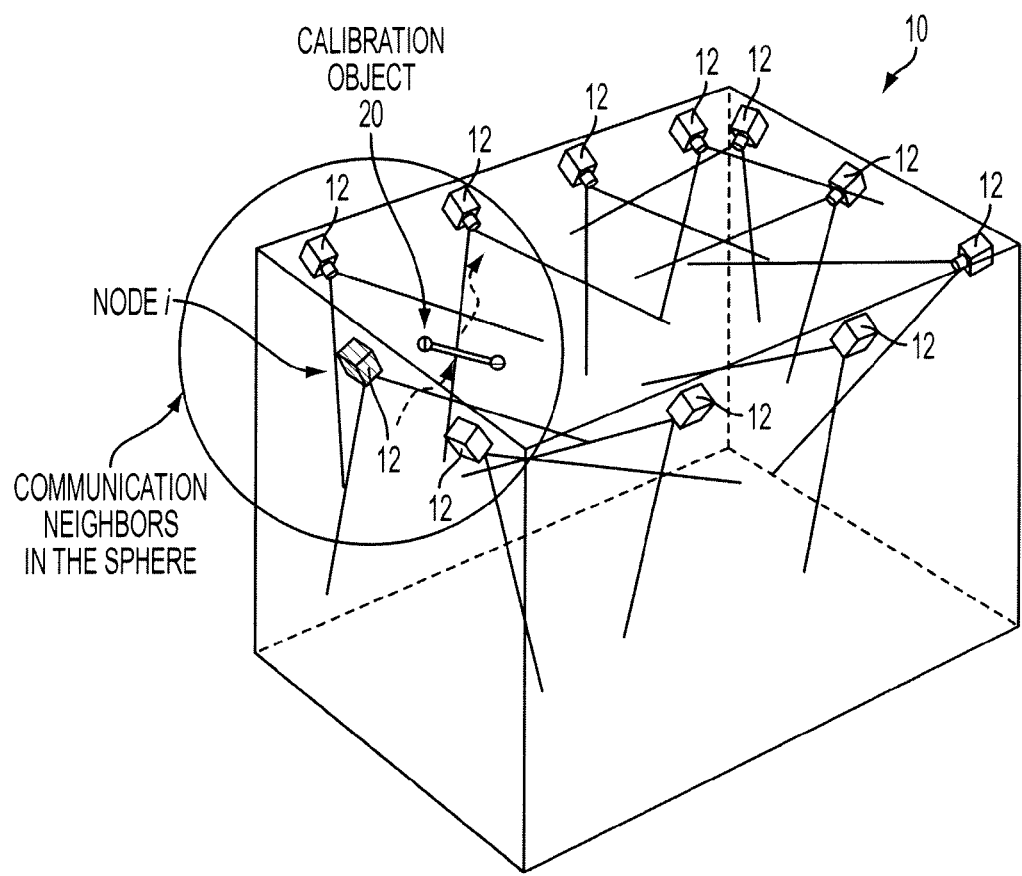
FIG. 4 illustrates an exemplary network including a camera node i observing the calibration object of FIGS. 1 and 2A.
Figure 5:
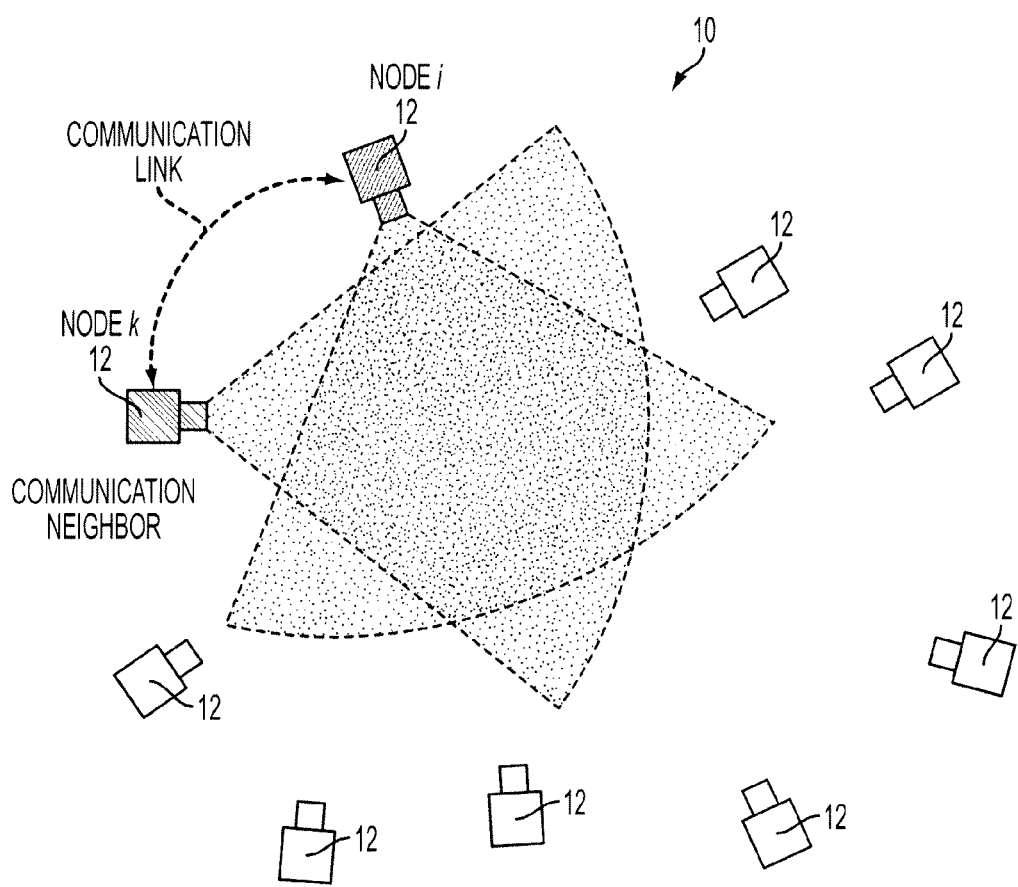
FIG. 5 illustrates a two-dimensional schematic of two camera nodes that are both communication and vision neighbors.
Figure 6:
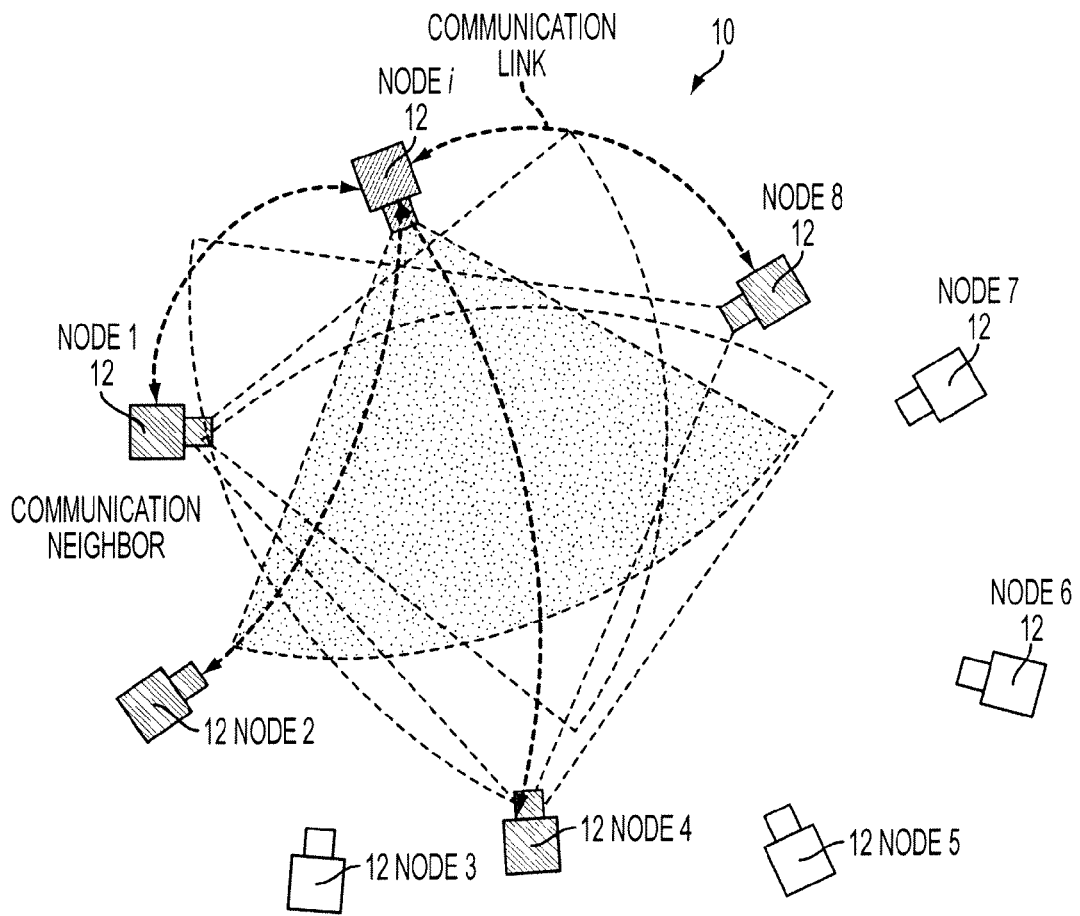
FIG. 6 illustrates a two-dimensional schematic of five camera nodes that are both communication and vision neighbors.

In the present disclosure, N is defined as the set of all camera nodes in a network. Each individual camera node in the network is designated as camera node i, (i∈N). For example, a network 10 having three camera nodes 12 is illustrated in FIG. 1. The neighbors of camera node i that are capable of direct (i.e., "one-hop") communications with camera node i are referred to herein as "communication neighbors" and are designated $S^i$. As shown in FIG. 1, "camera node 2" has two one-hop neighbors, "camera node 1" and "camera node 3." The communication neighbors of camera node i that share an overlapping viewing volume with camera node i are referred to herein as "vision neighbors" and designated as $V^i$. Consequently, ($V^i \subset S^i \subset N$). Examples of a network 10 of distributed camera nodes 12, including a camera node i and its neighbors, are illustrated in FIGS. 4 and 5. As shown in FIG. 4, the camera nodes 12 may be mounted in indoor environments, such as rooms, hallways, buildings, or in outdoor environments. Camera node i has several communication neighbors with which it may communicate via wired and/or wireless networks. FIG. 5, which is displayed in two dimensions for clarity, illustrates two communication neighbors, camera node and camera node k, with overlapping fields of view. In other words, camera node i and camera node k are also vision neighbors. FIG. 6, also in two dimensions, illustrates the camera node i having several communication and vision neighbors. As described above, for each camera node 12 in the network 10, the position and orientation with respect to a global coordinate frame may be designated by a camera parameter vector $p^{w,i}$ (e.g., a seven-dimensional vector including the rotation encoded as a unit quaternion and a three-dimensional translation vector; therefore, six degrees of freedom) and the relative position and orientation to each neighboring camera ($k \in V^i$) may be defined by a camera parameter vector $p^{i,k}$. These camera parameters allow an estimation of a set of calibration parameters $P^i = \{p_{w,i}, p^{i,k} | k \in V^i\}$, for all camera nodes $i \in N$. These calibration parameters $P^i$ may be sent from each camera node 12 to its communication neighbors through the one-hop communication links described above.

Figure 7:
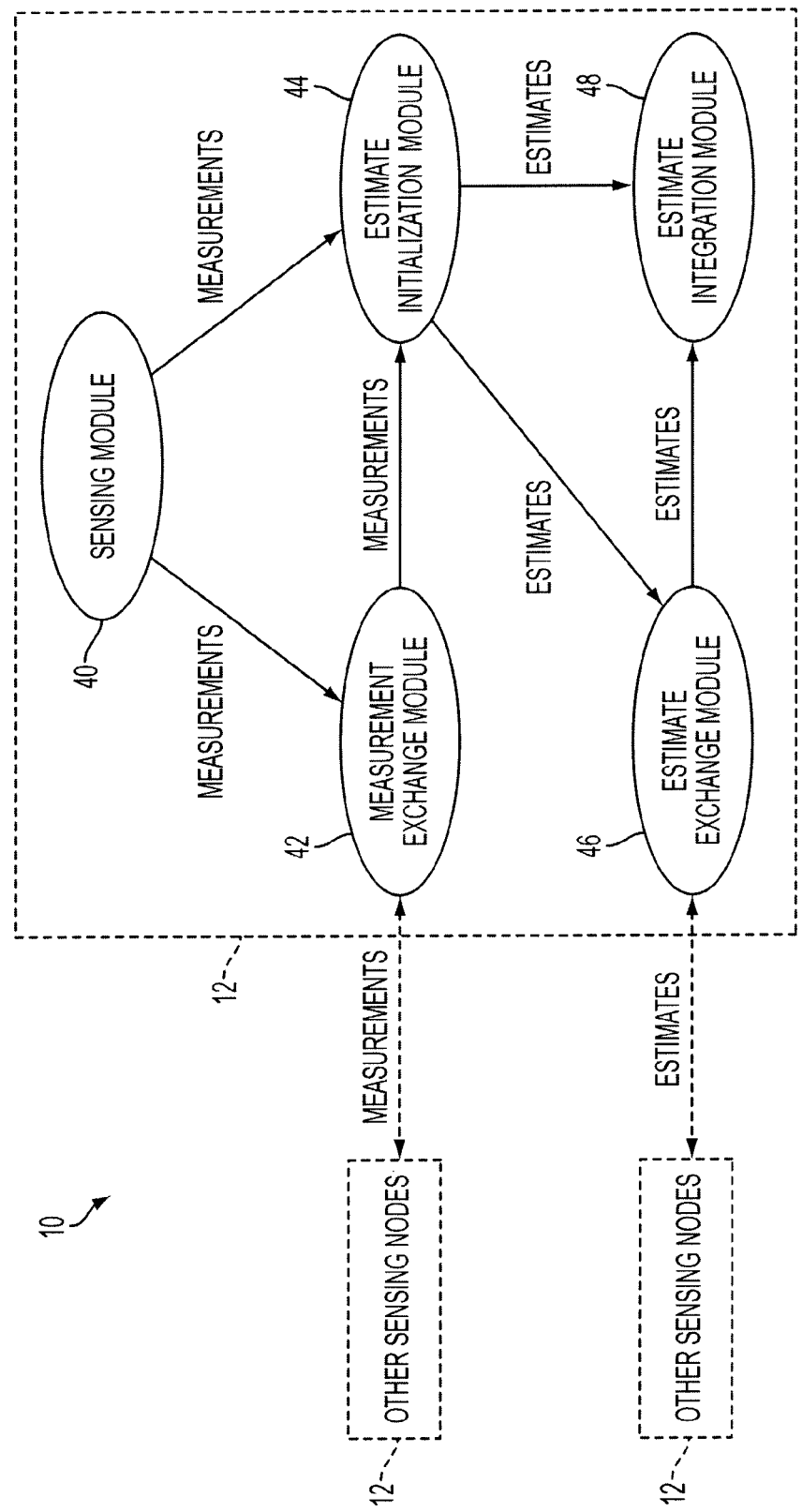
FIG. 7 illustrates one embodiment of the functional modules of a camera node.

Each camera node 12 in the network 10 includes several functional modules 40-48 to perform the calibration method according to the present disclosure, as illustrated in FIG. 7. In some embodiments, these modules may be implemented as software components stored and executed within the microprocessor and memory circuit 16 of the camera node 12 (shown in FIG. 1). In other embodiments, the modules may be implemented in hardware, firmware, or some combination of software, firmware, and hardware. In the embodiment of FIG. 7, the module structure includes a measurement sensing module 40, a measurement exchange module 42, an estimate initialization module 44, an estimate exchange module 46, and an estimate integration module 48. This module structure provides distributed processing, allowing each camera node 12 to individually estimate the calibration parameters of the network 10 simply by communicating with its communication neighbors. Therefore, this structure provides a scalable and robust system for the calibration of large camera networks—more precisely, the computation needed for a calibration is not affected by the number of camera nodes 12 in the network 10. Before describing the operation of the modules 40-48 in detail, an overview of their general interaction is provided.

Whenever the measurement sensing module 40 captures an image containing a calibration object 20, 30, it delivers the positions of the distinctive features 22, 24, 32-36 of the calibration object 20, 30 in the image to both the measurement exchange module 42 and the estimate initialization module 44. The measurement exchange module 42 receives measurement data regarding the calibration object 20, 30 from the measurement sensing module 40 in its own camera node 12 and the measurement sensing module 40 of other camera nodes 12. When the measurement exchange module 42 receives measurement data from the measurement sensing module 40 in its own camera node 12, it transmits the measurement data to its communication neighbors. When the measurement exchange module 42 receives measurement data from another camera node 12, the measurement exchange module 42 sends the measurement data to the estimate initialization module 44 in its own camera node 12.

The estimate initialization module 44 estimates an initial set of camera calibration parameters associated with its own camera node i by analyzing measurement data both from its own camera node i and from each of the camera nodes 12 in its communication neighborhood. For instance, where measurement data from camera node i and from camera node k is detected at substantially the same time (i.e., the calibration object 20, 30 is at substantially the same location in the global coordinate frame), this measurement data may be used to compute an initial estimate of the relative position and orientation of camera nodes i and k. This initial estimate computed by the estimate initialization module 44 is then delivered to the estimate exchange module 46 and the estimate integration module 48.

Upon receiving an estimate of the relative position and orientation of a pair of camera nodes 12, the estimate exchange module 46 transmits the initial set of camera calibration parameters to its communication neighbors. In addition, the estimate exchange module 12 receives initial sets of camera calibration parameters from the estimate exchange modules 46 of other camera nodes 12 and delivers these sets of camera calibration parameters to the estimate integration module 48 in its own camera node 12. In this way, the estimate exchange modules 46 of the various camera nodes 12 exchange initial sets of calibration parameters. The estimate integration module 48 estimates an updated set of camera calibration parameters for each of the plurality of camera nodes 12 in response to the exchanged initial sets of calibration parameters. More specifically, the estimate integration module integrates the calibration parameters obtained from its own camera node 12 and those obtained from its communication neighbors.

Proceeding now to the detailed description of the operation of the modules 40-48, the function of the measurement sensing module 40 is to detect a calibration object 20, 30 in a captured image, to generate measurement data in the form of image positions of the distinctive features 22, 24, 32-36 of the calibration objects 20, 30, and to send this generated measurement data to the measurement exchange module 42 and the estimate initialization module 44 of the camera node 12. The process 50 performed by the measurement sensing module 40 is summarized in Algorithm 1 below, named Measurement-Sensing ( ) and is also presented as a flowchart in FIG. 8. After capturing a raw image with its image sensor 18, the camera node 12 stores the raw image in the memory of the circuit 16. The microprocessor of circuit 16 then retrieves the stored raw image and performs image processing (using programs that are also stored in the memory) to determine if the calibration object 20 is present. When the calibration object 20 is present, the microprocessor may calculate the image position corresponding to the center of mass of each distinctive feature 22, 24. By way of example, these image positions may be calculated using a simple image processing technique, such as a color detection algorithm. Once a camera node 12 has detected the calibration object 20, the microprocessor of circuit 16 constructs a measurement tuple $z^i$ using the calibration information obtained from the raw image. Here $z_j^i$ denotes the j-th measurement tuple generated by i-th camera node, $m_j^i$ is a measurement vector that contains the image coordinates of the distinctive features of calibration object 20, $d_j^i$ is a description vector that uniquely identifies the calibration object 20, and $t_j^i$ is represents the time at which the image containing the calibration object 20 was captured (e.g., a time stamp). For instance, where the calibration object 20 having two distinctive features 22, 24 is used, the measurement vector may be defined as $m_j^i = [u_1, v_1, u_2, v_2]^T$, where $u_1$ and $v_1$ correspond to the image coordinates of distinctive feature 22 and $u_2$ and $v_2$ correspond to the image coordinates of distinctive feature 24. Finally, the tuple is delivered to the measurement exchange module 42 and the estimate initialization module 44.

---
Algorithm 1 (Process 50)
---

Measurement-Sensing ( )
    Capture a raw image.
    Search for a calibration object in the raw image.
    If a calibration object (j) is detected, then
        Characterize the calibration object in the image and create a
            measurement tuple $z_j^i = (m_j^i, d_j^i, t_j^i)$.
        Deliver a message consisting of the camera node ID (i) and the
            measurement tuple $z_j^i$ to measurement exchange module and
            estimate initialization module in own camera node.
    End if

---

Figure 8:
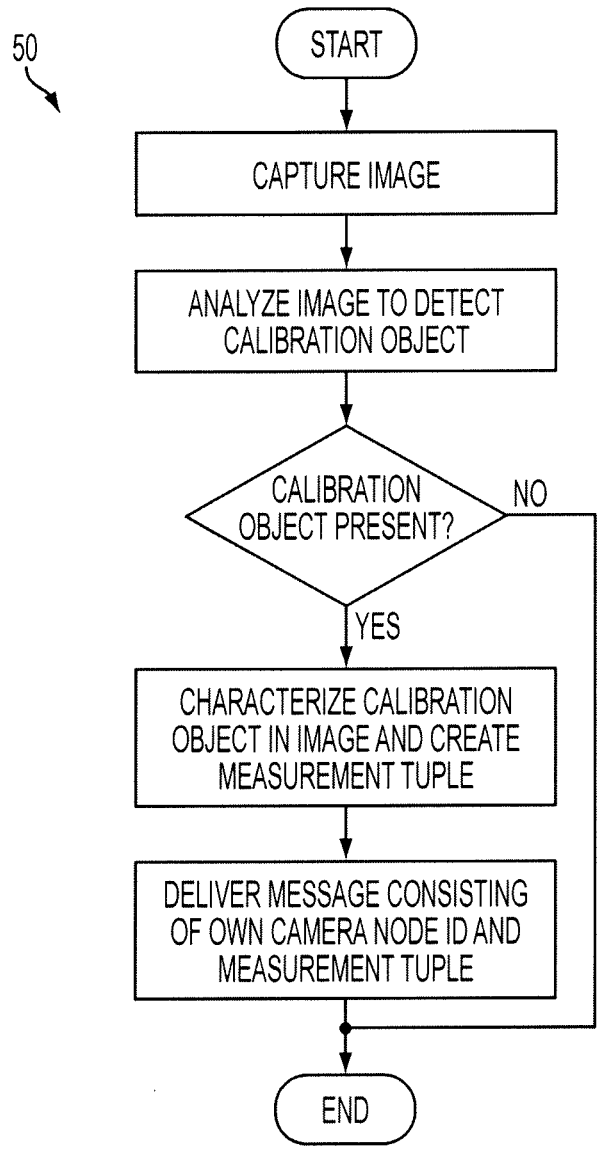
FIG. 8 illustrates one embodiment of a process performed by one of the functional modules of FIG. 7.
Figure 9:
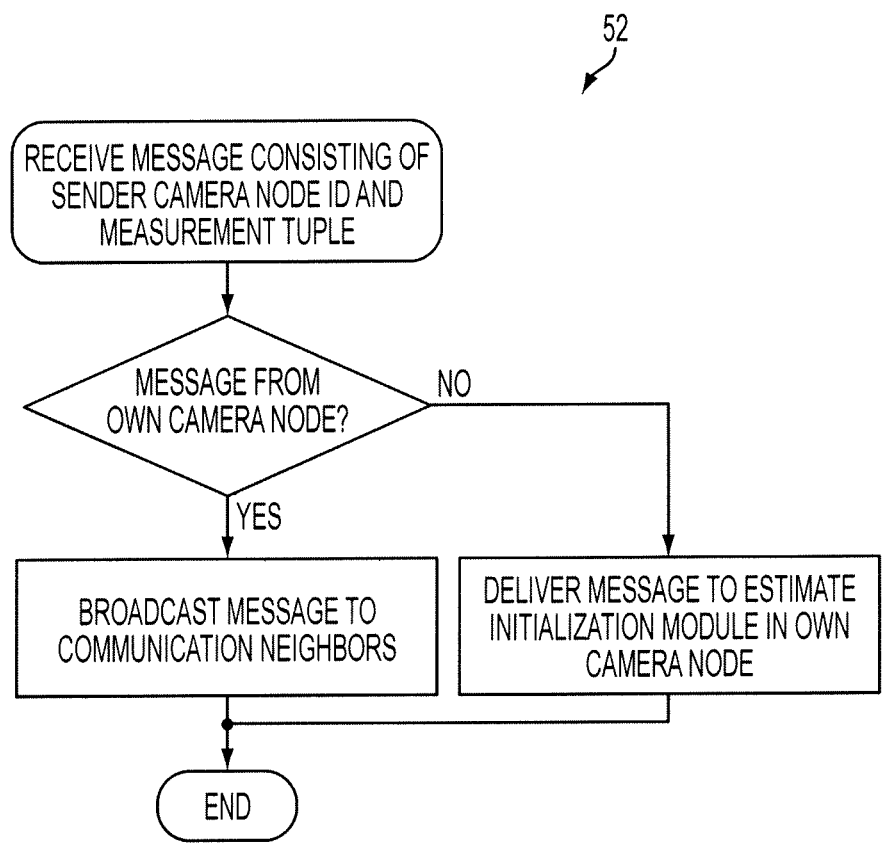
FIG. 9 illustrates one embodiment of a process performed by one of the functional modules of FIG. 7.
Figure 10:
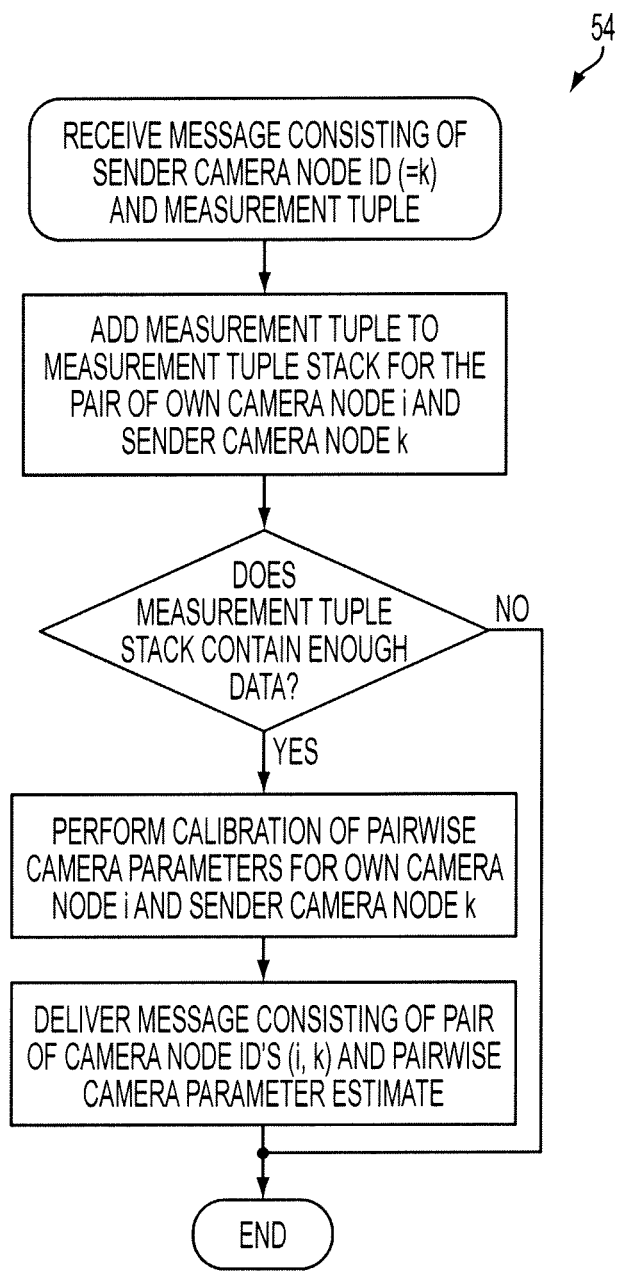
FIG. 10 illustrates one embodiment of a process performed by one of the functional modules of FIG. 7.
Figure 11:
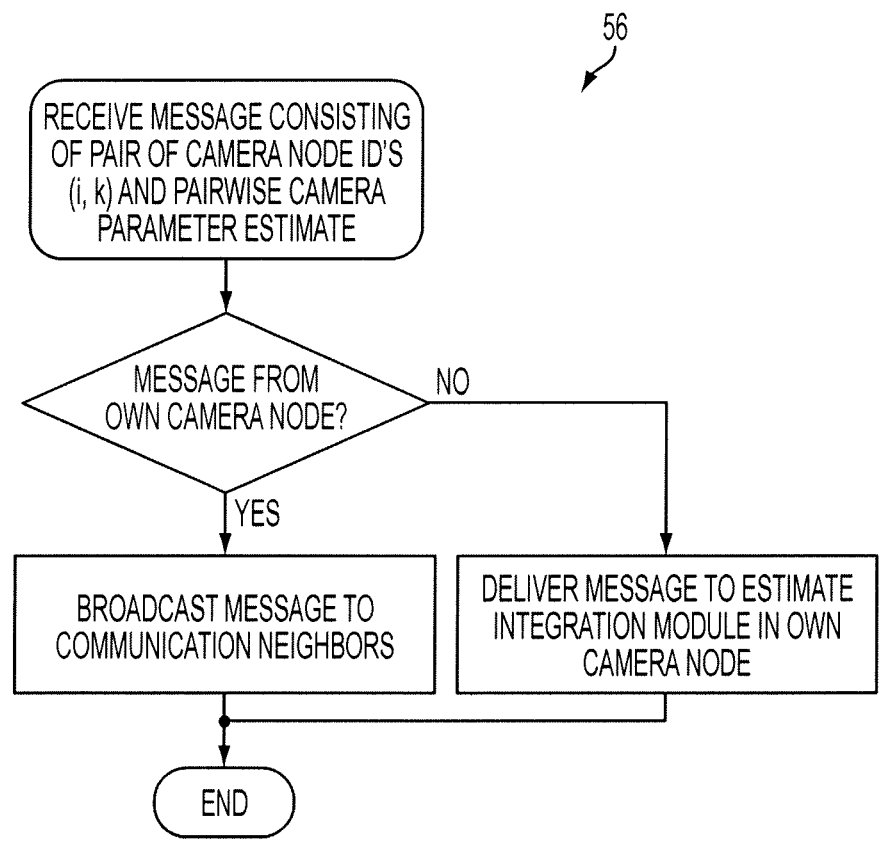
FIG. 11 illustrates one embodiment of a process performed by one of the functional modules of FIG. 7.
Figure 12:
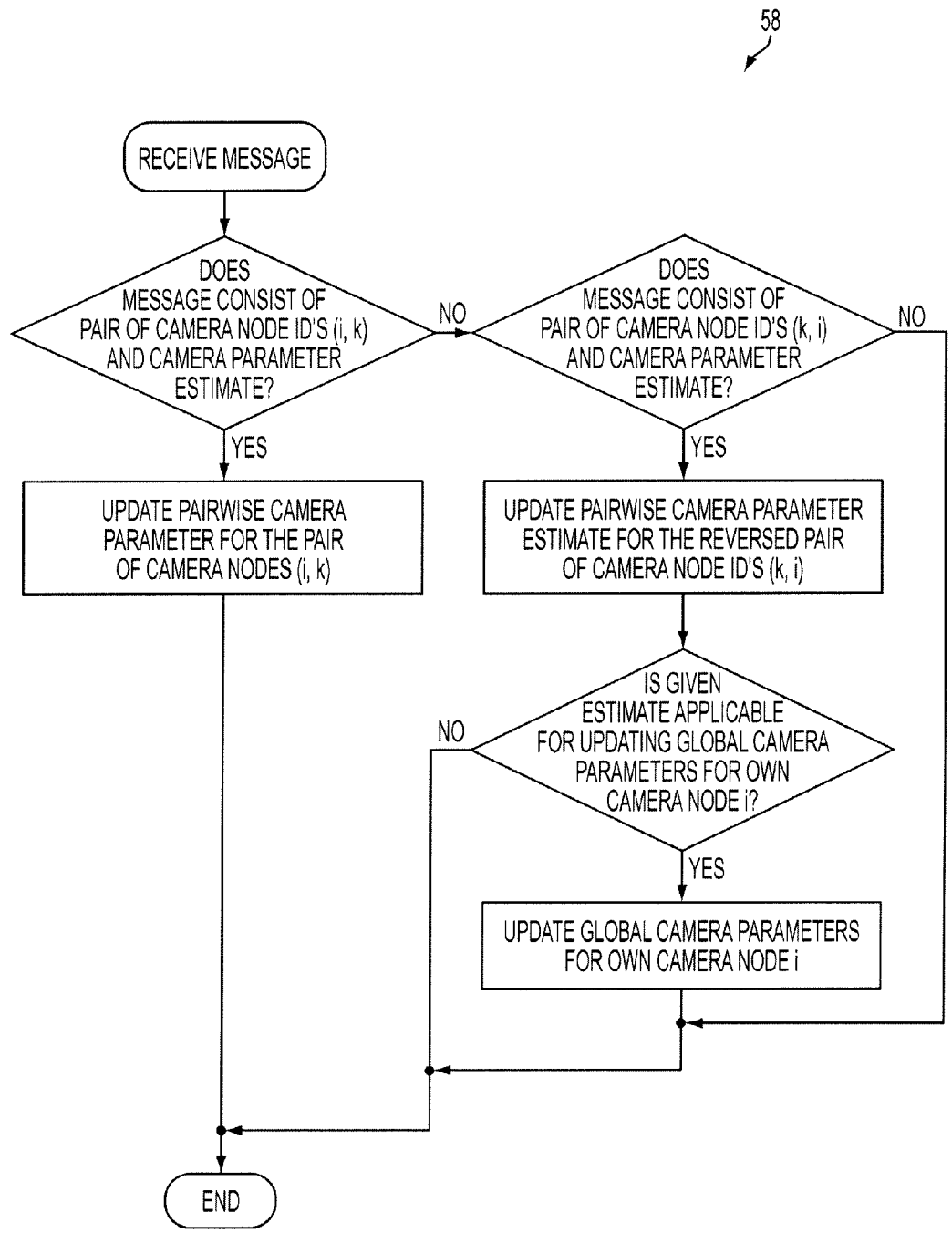
FIG. 12 illustrates one embodiment of a process performed by one of the functional modules of FIG. 7.

As illustrated in FIG. 8, the process 50 begins with a camera node 12 capturing a raw image. Next, a calibration object (e.g., the two-LED-target calibration object 20) is searched in the captured image. If no calibration object is found by the camera node 12, the process 50 ends. If a calibration object j is detected, the process 50 instead proceeds characterize the calibration object in the image by its image coordinates, represented by the measurement vector $m_j^i = (u_1, v_1, u_2, v_2)$, the description vector $d_j^i$, and the time stamp $t_j^i$ when the image was captured. A measurement tuple $z_j^i$ is then generated with $m_j^i$, $d_j^i$, and $t_j^i$. Finally, the measurement tuple $z_j^i$ is delivered to the measurement exchange module 42 (for communicating with other camera nodes 12) and the estimate initialization module 44 of the camera node 12.

The function of the measurement exchange module 42 is to exchange measurement data between a camera node i and its communication neighbors by sending and receiving messages consisting of a camera node ID and a measurement tuple. The process 52 performed by the measurement exchange module 42 is summarized in Algorithm 2 below, named Measurement-Exchange-by-Peer-to-Peer ( ) and is also presented as a flowchart in FIG. 9. The measurement exchange module 42 remains in an idle state until a message is received. When a message n consisting of a camera node ID and a measurement tuple, represented by $n=(i_n, z_j^{i_n})$ is received by the module 42, the process 52 is started. If the camera node ID in the message indicates that it originated from the measurement sensing module 40 of the same camera node 12, that is $i_n=i$, the message is broadcast to the node's communication neighbors. Otherwise, the message n is delivered to the estimate initialization module 44 of the camera node 12.

---
Algorithm 2 (Process 52)
---

Measurement-Exchange-by-Peer-to-Peer ( )
    If a message $n = (i_n, z_j^{i_n})$ is received, then
        If the message is from own camera node, then
            Broadcast the message $n = (i_n, z_j^{i_n})$ to communication
                neighbors.
        else
            Deliver the message to estimate initialization module in
                own camera node.
        End if
    End if

---

The function of estimate initialization module 44 is to estimate the pairwise camera parameters with the communication neighbors of a camera node 12. The process 54 performed by the estimate initialization module 44 is summarized in Algorithm 3 below, named Estimate-Initialization ( ) and is also presented as a flowchart in FIG. 10. The estimate initialization module 44 remains in an idle state until a message is received. When a message n consisting of a camera node ID and a measurement tuple, represented by $n=(i, z_j^i)$, is received, the process 54 is started. As a camera node i continues to collect measurements related to the calibration object 20, it constructs a set of measurement tuples, designated by $Z^i$. $Z^i$ may be mathematically defined as:

$$Z^i = \{z_j^i | z_j^i = (m_j^i, d_j^i, t_j^i)\} \quad (8).$$

Each camera node 12 in the network not only accumulates its own local measurement set $Z^i$ but also the measurement sets $Z^k$ received from its communication neighbors, $k \in S^i$. In each camera node i, when a new tuple is received from the measurement sensing module 40, the tuple is added to $Z^i$. When a message is received from a neighboring node k, the tuple in the message is added to the set of tuples $Z^k$. For each pair of communication neighbors, both camera nodes 12 calculate local calibration information for one another. During this tuple collection step of process 54, a calibration object 20 is identified by its description vector $d_j^i$, and image acquisition within the network 10 is time-synchronized on the basis of time stamps $(t_j^i)$ to combine two measurement tuples: $z_j^i$ (coming from camera node i) and $z_l^k$ (coming from camera node k). More specifically, two tuples $z_j^i$ and $z_l^k$ are combined when these tuples have companion measurements which meet a condition:

$$f((d_j^i, t_j^i), (d_l^k, t_l^k)) < e \quad (9),$$

where $f(.,.)$ is a function to measure the difference between pairs of descriptions and time stamps and e is some predetermined threshold. The function $f(.,.)$ satisfying this relationship indicates that the difference between the time stamps of the measurement tuples, $t_j^i$ and $t_l^k$, is sufficiently small and their descriptions, $d_j^i$ and $d_l^k$, are almost the same. In some embodiments, the function $f(.,.)$ may be defined as:

$$f((d_j^i, t_j^i), (d_l^k, t_l^k)) = |d_j^i - d_l^k| + |t_j^i - t_l^k| \quad (10).$$

A set of combined tuples from camera node i and camera node k may be accumulated to a stack of combined tuples as:

$$C^{i,k} = \{(z_j^i, z_l^k) | z_j^i \in Z^i, z_l^k \in Z^k, f((d_j^i, t_j^i), (d_l^k, t_l^k)) < e\} \quad (11).$$

When a sufficient number of measurements are accumulated in each camera node 12, a number of corresponding measurements obtained from neighboring camera nodes 12 may also be accumulated. It is known in the art that eight or more corresponding image points between a pair of cameras may be used to compute the relative calibration parameters between two cameras up to an unknown scale, as described in Equation 7. Thus, for each neighboring camera node 12 with at least eight corresponding measurements, a pairwise calibration may be performed to compute the relative position and orientation of the neighboring camera node 12. More specifically, it is possible to estimate the relative calibration parameters, $\hat{p}^{i,k} = [(q^{i,k})^T (\hat{t}^{i,k})^T]^T$ (the hat symbol ^ designating an unknown scale), using a set of corresponding image coordinates $C^{i,k}$. It should be noted that the two view structure $\hat{p}^{i,k}$ is equivalent to the fundamental matrix shown in Equation 7.

Furthermore, the correct scale for each pairwise calibration may be computed, because the distance 26 between the pair of distinctive features 22, 24 is known to each camera node 12. Based on camera parameter estimates for camera node i and camera node k in $\hat{p}^{i,k} = [(q^{i,k})^T (\hat{t}^{i,k})^T]^T$, the 3D coordinates of each of the corresponding measurements in $C^{i,k}$ may be calculated using stereo triangulation with an unknown scale. The reconstructed 3D coordinates of the two distinctive features 22 and 24 from this triangulation must satisfy the distance constraint, since the distance between the two distinctive features 22 and 24 is known. Therefore, it is possible to estimate the scale associated with the pairwise camera parameters $\hat{p}^{i,k} = [(q^{i,k})^T (\hat{t}^{i,k})^T]^T$. and, thus, to estimate the pairwise camera parameters $p^{i,k} = [(q^{i,k})^T, (t^{i,k})^T]$.

Once the pairwise camera parameters have been estimated, it is also possible to evaluate how much estimation error is involved in the pairwise camera parameters using the covariance matrix. The image measurement may be contaminated with noise as measurement error. For example, the image measurements associated with distinctive features 22 and 24 may also involve measurement error, which may be characterized by the covariance matrix. The estimates calculated from the image measurements may also be characterized by the covariance matrix. Chapter five of Faugeras, cited above, describes an analysis of a covariance matrix representation for the parameter estimation.

In the case of pairwise camera parameters, the covariance matrix of the estimated parameters $p^{i,k}=[(q^{i,k})^T,(t^{i,k})^T]$ may be represented by its covariance matrix $\Sigma^{i,k}$. After each pairwise calibration is completed, the covariance $\Sigma^{i,k}$ corresponding to the calibration parameter vector $p^{i,k}$ may be estimated using the following series of calculations. First, each observation $m_j^k$ by camera node k may be mapped to a corresponding observation $m_j^i$ by camera node i using the function $m_j^i = h^{i,k}(p^{i,k}, m_j^k)$. Next, a stacked observation vector of n corresponding observations from camera nodes i and k (i.e., $x^{i,k} = (m_1^k, \ldots, m_n^k, m_1^i, \ldots, m_n^i)$) may be related to the camera parameters by the function $x^{i,k} = f^{i,k}(p^{i,k}, m_1^i, \ldots, m_n^i)$. The covariance of $p^{i,k}$ and $m_j^k$ are then given by:

$$\sum_{p,m}^{i,k} = \begin{bmatrix} A^T \sum_x^{-1} A & A^T \sum_x^{-1} B \\ B^T \sum_x^{-1} A & B^T \sum_x^{-1} B \end{bmatrix}^\alpha, \quad (12)$$

where $\alpha$ denotes the pseudo-inverse, $$A = \frac{\partial f^{i,k}(.)}{\partial p}, \quad B = \frac{\partial f^{i,k}(.)}{\partial m_1^i, \ldots, m_n^i},$$

and $\Sigma_x$ is the covariance matrix of $x_k^i$. The top left portion of the matrix of Equation 12 corresponds to the covariance of the relative position parameters of $\Sigma^{i,k}$. Once estimates of the calibration estimation vector $p^{i,k}$ and its companion covariance matrix $\Sigma^{i,k}$ are known, both the estimation vector $p^{i,k}$ and the companion covariance matrix $\Sigma^{i,k}$ may be recursively updated, as described below.

Algorithm 3 summarizes an illustrative pairwise estimation procedure that may performed by each camera node 12 in the network 10 to implement the process 54. In process 54, each camera node i computes relative position parameters and a corresponding covariance matrix $(p^{i,k}, \Sigma^{i,k})$ with respect to each of its neighboring camera nodes k with which it has enough corresponding image points (e.g., if the number is greater than eight). Finally, these initial parameter estimates are delivered to the estimate exchange module 46 and the estimate integration module 48 of the camera node 12.

---
Algorithm 3 (Process 54)
---

Estimate-Initialization ( )
    If a message consisting of sender camera node ID (=k) and
        measurement tuple is received, then
        Add the measurement tuple to the measurement tuple stack $C^{i,k}$
            for the pair of own camera node i and the sender camera
            node k.

---
Algorithm 3 (Process 54)
---

If the measurement tuple stack $C^{i,k}$ contains enough data, then
        Perform calibration of pairwise camera parameters $(p^{i,k}, \Sigma^{i,k})$
            for own camera node i and the sender camera node k.
        Deliver a message consisting of the pair of camera node
            ID's (i,k) and the pairwise camera parameter estimate
            $(p^{i,k}, \Sigma^{i,k})$ to two estimate exchange module and
            estimate integration module in own camera node.
    End if
End if The function of the estimate exchange module 46 is to exchange estimates calculated in a camera node 12 and its communication neighbors by sending and receiving messages containing estimated pairwise camera parameters. The process 56 performed by the estimate exchange module 46 is summarized in Algorithm 4 below, named Estimate-Exchange O, and is also presented as a flowchart in FIG. 11. The estimate exchange module 46 remains in an idle state until a message is received. When a message n consisting of the pair of camera node ID's ($i_n$, k) and a pairwise camera parameter estimate, represented by $n=(i_n, k, p^{i_n,k}, \Sigma^{i_n,k})$ is received, the process 56 is started. If the camera node ID in the message indicates that it originated from the estimate integration module 48 of the same camera node 12, that is $i_n = i$, the message n is broadcast to the node's communication neighbors, $k \in S^i$. Otherwise, the message n is delivered to the estimate integration module 48 in the camera node 12.

---
Algorithm 4 (Process 56)
---

Estimate-Exchange ( )
    If a message $n = (i_n, k, p^{i_n,k}, \Sigma^{i_n,k})$ consisting of the pair of camera node
        ID's ($i_n$,k) and a pairwise camera parameter estimate is received,
    then
        If the message is from own camera node, then
            Broadcast the message $n = (i,k, p^{i,k}, \Sigma^{i,k})$ to communication
            neighbors.
        Else
            Deliver the message to estimate integration module in own
            camera node.
        End if
    End if The function of the estimate integration module 48 is to update relative camera calibration information for each pair of camera nodes 12 using received estimated pairwise camera parameters. The process 58 performed by the estimate integration module 48 is summarized in Algorithm 5 below, named Estimate-Integration ( ) and is also presented as a flowchart in FIG. 12. The estimate integration module 48 remains in an idle state until a message is received. When either a message n consisting of the pair of camera node ID's (i, k) and a pairwise camera parameter estimate, represented by $n=(i, k, p^{i,k}, \Sigma^{i,k})$, or a message n consisting of the pair of camera node ID's (k, i) and a pairwise camera parameter estimate, represented by $n=(k, i, p^{k,i}, \Sigma^{k,i})$, is received, an integration of the pairwise camera parameter estimate is performed.

The process 58 involves a parameter refinement, in which a recursive estimation of calibration parameters is used to reduce noise in the measurements. If a message $n=(i, k, p^{i,k}, \Sigma^{i,k})$ is received, the pairwise camera parameter for the pair of the camera nodes (i, k) is updated using $(p^{i,k}, \Sigma^{i,k})$. Instead, if a message $n=(k, i, p^{k,i}, \Sigma^{k,i})$ is received, the pairwise camera parameter for the pair of the camera nodes (i, k) is updated using $n=(k, i, p^{k,i}, \Sigma^{k,i})$ inverted. This parameter refinement in process 58 is carried out by each camera node 12. Because this local calibration is carried out independently at each camera node 12, two neighboring cameras nodes i and k, where i∈$V^k$ and k∈$V^i$, each has its own estimate of the other (i.e., $p^{i,k}$ computed at camera node i and $p^{i,k}$ computed at camera node k). Theoretically, the two should be inverse transformations of one another, H($p^{i,k}$)=H($p^{k,i}$)$^{-1}$ but this does not happen in practice due to measurement noise. H($p^{i,k}$) is a homogeneous transformation matrix from the camera coordinate k to i computed from $p^{i,k}$. Integration of these estimates in the two cameras can improve the accuracy of the calibration results.

The integration of calibration estimates in parameter refinement of process 58 may further improve the accuracy of an online calibration method where the camera nodes 12 in the network 10 compute new calibration estimates as more measurements are acquired locally and received from neighboring camera nodes 12. In the illustrative embodiment, a weighted least-squares technique is used to integrate a previous estimate (p(t−1),Σ(t−1)) with a new estimate (p'(t),Σ'(t)) into a more accurate estimate (p(t),Σ(t)) using the following recursive series:

$$K=\Sigma(t-1)(\Sigma(t-1)+\Sigma'(t))^{-1} \quad (13),$$

$$p(t)=p(t-1)+K(p'(t)-p(t-1)) \quad (14)$$

$$\Sigma(t)=\Sigma(t-1)-K\Sigma(t-1) \quad (15)$$

Under a Gaussian noise assumption, p(t) of Equation 14 corresponds to an unbiased estimator of the real camera properties of each camera node 12.

The calculations described thus far by the present disclosure only provide each camera node 12 with the relative positions and orientations of its neighbors. This local location information is defined in terms of a local coordinate frame (namely, the i-th camera coordinate frame) with respect to the rest of the camera nodes 12 in the network 10. As described in Iyengar et al., cited above, a reference index may be used to relate the local location information to a globally common coordinate frame. In the illustrative embodiments, each camera node 12 in the network 10 initially sets its reference index (w) to its own node ID (the node ID being set during system deployment). Thus, each camera node 12 initially considers w=i, $p^{w,i}$=0, and H($p^{w,i}$)=I. Whenever the camera node i receives calibration parameters of a neighboring camera node k with a lower reference frame index, however, the camera node i changes its reference frame index and transforms the reference coordinate frame to the coordinate frame of the camera node k. Once calibration under this procedure is complete, the reference coordinate frames of all the camera nodes 12 in the network 10 will be the coordinate frame of the node with the lowest ID (i.e., the first camera coordinate frame will be the world coordinate frame). Therefore, it is possible to estimate the camera parameters of all camera node frames with respect to the world coordinate frame. It will be appreciated that other ordering schemes (such as highest, rather than lowest, reference index) may be used to determine the global coordinate frame.

---

Algorithm 5 (Process 58)

Estimate-Integration ( )
    When a message n is received.
        If the message n consists of the pair of camera node ID's (i, k) and a
            pairwise camera parameter estimate, that is, n = (i,k,$p^{i,k}$,$\Sigma^{i,k}$),
            then
                Update pairwise camera parameter estimate ($p^{i,k}$,$\Sigma^{i,k}$) for the
                    pair of camera nodes (i, k).

---

Algorithm 5 (Process 58)

Else if the message n consists of the pair of camera node ID's (k, i)
        and a pairwise camera parameter estimate, that is, n =
        (k,i,$p^{k,i}$,$\Sigma^{k,i}$), then
        Update pariwise camera parameter estimate ($p^{i,k}$,$\Sigma^{i,k}$) for the
            reversed pair of camera nodes (k, i).
        If the given estimate is applicable for updating the world camera
            parameters for own camera node i, then
                Update the world camera parameters for own camera node
                i.
        End if
    End if

---

Figure 13:
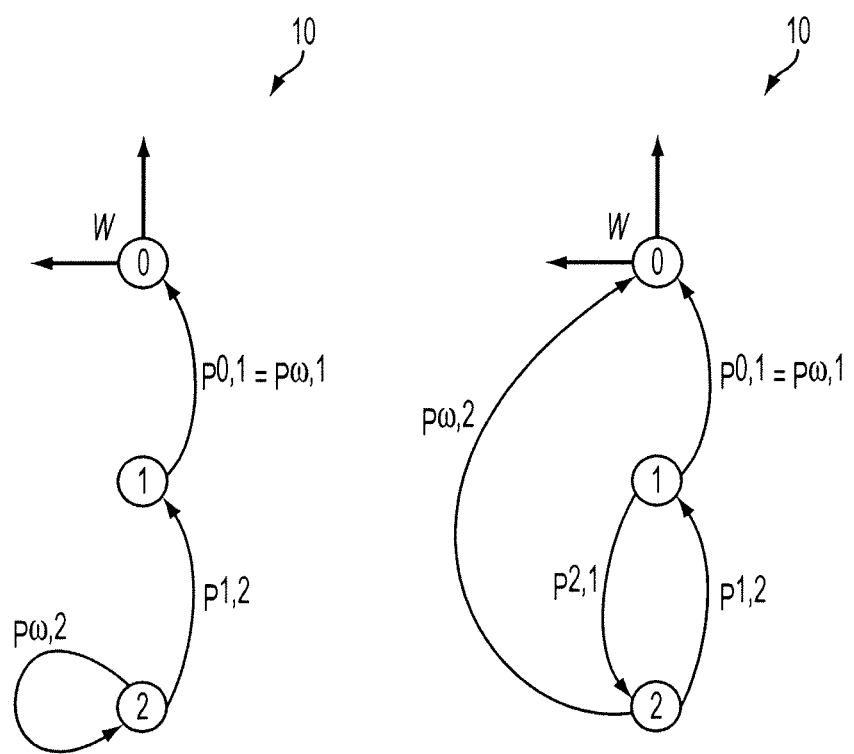
FIG. 13 is a simplified diagram illustrating an exemplary network including three camera nodes at two different moments during the implementation of an illustrative recursive estimation procedure.

A diagram of an illustrative network 10 (containing camera node "0," camera node "1," and camera node "2") during two different moments in the recursive estimation procedure of Algorithm 2 is also presented in FIG. 13. The left side of FIG. 13 illustrates the status of the network 10 at a moment when camera node 1 has already computed $p^{0,1}$ (its relative position parameters with respect to camera node 0) and camera node 2 has already computed $p^{1,2}$ (its relative position parameters with respect to camera node 1). At that same moment, camera node 1 has also defined its relative position to the origin as camera node 1 receives new measurements from camera node 2, it computes $p^{2,1}$ (its relative position parameters with respect to camera node 2) and broadcasts these new parameters, along with its own relative position with respect to the origin $p^{w,1}$. After camera node 2 receives $p^{2,1}$ and $p^{w,1}$ from camera node 1, it updates its own estimate $p^{1,2}$ based on Equations 9 and 10 and the inverse transformation H($p^{2,1}$)$^{-1}$. Camera node 2 then verifies that the node ID of the sender (i.e., camera node 1) is lower than its own node ID and replaces its global position vector $p^{w,2}$ by the parameter vector corresponding to the homogenous transformation H($p^{w,1}$) H($p^{1,2}$) The right side of FIG. 13 illustrates the status of the network 10 at this moment.

Figure 14:
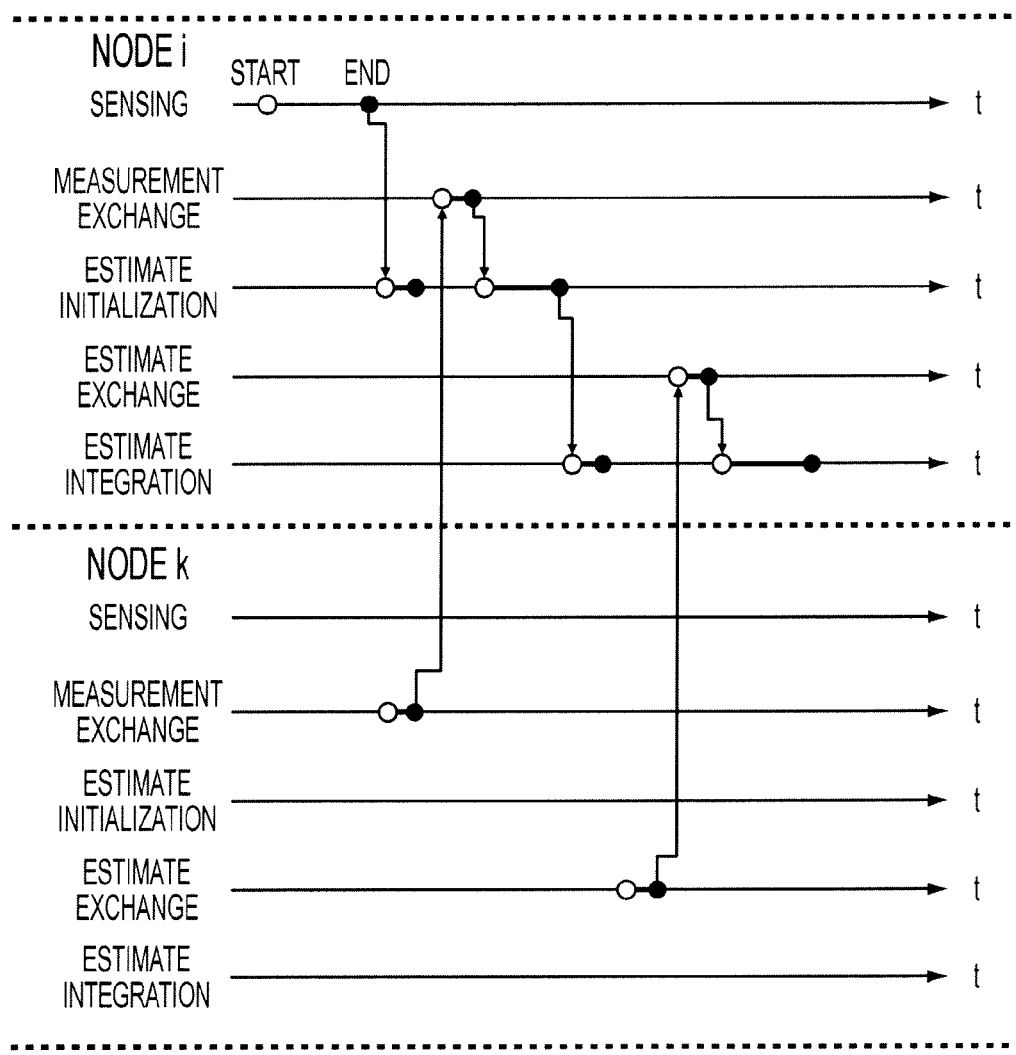
FIG. 14 is a simplified diagram illustrating one embodiment of the operations performed by the modules of FIG. 7.

The processes 50-58 performed by the measurement sensing module 40, the measurement exchange module 42, the estimate initialization module 44, the estimate exchange module 46, and the estimate integration module 48 may be executed autonomously and iteratively. In one illustrative embodiment, shown in FIG. 14, the iterations of the peer-to-peer distributed calibration method may be carried out each time the measurement sensing module 40 detects a calibration object 20 in a captured image. The events which take place in two different camera nodes i and k are illustrated in FIG. 14 by the dots on the time lines. Empty dots represent the beginning of a given event (named in the left column) and the solid dots represent the end of the event. FIG. 14 also illustrates the interactions among the two camera modules as vertical arrows. A vertical arrow that leaves a dot in one node 12 and enters a dot in another node 12 represents a message that is passed between nodes 12. While the example shown in FIG. 14 focuses on the events that take place at camera node i for clarity, a similar sequence of events takes place at node k.

Initially, camera node i senses a calibration object with measurement sensing module 40 and sends the object information to the estimate initialization module 44. Camera node k then sends a recently obtained measurement of the object to camera node i via the measurement exchange module 42, which delivers this measurement to the estimate initialization module 44 where the relative calibration parameters between the two nodes 12 are computed. These parameters are then delivered to the estimate integration module 48. Afterwards, camera node k transmits its own estimated parameters to camera node i via the estimate exchange module 46 (as mentioned above, the computations carried out by node k are omitted for simplicity). The estimate exchange module 46 delivers the received estimates to the estimate integration module 48 where a refined estimate is computed based on the estimate received from camera node k and the estimate previously computed by camera node i. Algorithm 6, named Peer-to-Peer-Calibration ( ) illustrates an example of the sequential execution of this embodiment. As explained above, this embodiment is implemented in a distributed manner. Thus, the order in which the modules 40-48 are called in Algorithm 6 may be changed.

---
Algorithm 6
---
Peer-to-Peer-Calibration ( )
    While 1
        Measurement-Sensing ( )    //calls Algorithm 1
        If Measurement-Exchange ( ) receives a    //calls Algorithm 2
        message then
            Estimate-Initialization( )    //calls Algorithm 3
        End if
        If Estimate-Exchange( ) receives a    //calls Algorithm 4
        message then
            Estimate-Integration( )    //calls Algorithm 5
        End if
    End while
---

This peer-to-peer distributed network approach implemented by the first illustrative embodiment allows for a robust and scalable implementation due to its completely distributed nature. Even if a portion of a network 10 fails, calibration parameters may be estimated for the remainder of the network 10. Furthermore, the computational requirements are not dependent on the number of camera nodes 12 in the network 10, improving the scalability of a network 10 using this peer-to-peer distributed network approach. Enlarging the network 10 is not burdensome as additional camera nodes 12 may be added to the network 10 by moving the calibration object to the new area and allowing the accumulation of calibration results within the new area. In addition, even if any local changes of camera configurations occur, the revision of calibration can be carried out only within a local area (by processing locally within local communication neighbors of cameras.) Finally, this peer-to-peer distributed network approach allows for a network 10 to continuously improve the estimated calibration parameters as new observations become available.

The second illustrative embodiment of the systems and methods for calibrating a large network of directional sensors, according to the present disclosure, employs dynamic clustering of the sensor nodes. It is possible to further improve the calibration approach presented in the first illustrative embodiment (peer-to-peer distributed calibration) by using a cluster-based distributed calibration approach. Cluster-based distributed calibration reduces the energy consumption in the network by decreasing the amount of time each individual node listens to messages from its neighbors. Cluster-based distributed calibration operates to assign roles to the various nodes using an event-driven clustering protocol. Once a cluster is created, only the cluster head (as assigned by the event-driven clustering protocol) is responsible for receiving the measurements from the cluster members and computing their relative positions, possibly avoiding unnecessary energy usage.

One event-driven clustering protocol which may be used in the second illustrative embodiment is described in U.S. patent application Ser. No. 12/236,238, entitled "Clustering Protocol for Directional Sensor Networks," the entire disclosure of which is expressly incorporated herein by reference. As described therein, this protocol is configured such that, when a calibration object is detected, camera nodes that detect the calibration object create a cluster that can communicate in a single hop and self-elect a cluster head among themselves. If the calibration object can be detected by camera nodes that cannot communicate in a single hop, multiple single-hop clusters are formed. If more than one calibration object is detected, multiple clusters are formed based on the visual features of the calibration objects. As the calibration object(s) move(s), new camera nodes that detect a calibration object join the appropriate cluster, camera nodes that lose a calibration object leave the corresponding cluster, and, when a cluster head loses track of a calibration object, the role of cluster head is self-assigned to a different camera node.

The second illustrative embodiment also employs a measurement sensing module 40, a measurement exchange module 42, an estimate initialization module 44, an estimate exchange module 46, and an estimate integration module 48 (shown in FIG. 7). Due to the event-driven clustering protocol, however, the processes 50-58 performed by these modules 40-48 are modified from those described above (for the first illustrative embodiment). For instance, only cluster heads collect measurements and perform Estimate-Initialization( )(process 54). The dynamic clustering of camera nodes 12 provides the benefits of the peer-to peer distributed network approach, while also improving energy efficiency of the camera network. In some embodiments, camera nodes 12 not involved in the calibration process at any give time may be temporarily turned off. This feature of the second illustrative embodiment may provide for improved operational life, particularly in battery-operated sensor networks.

Figure 15:
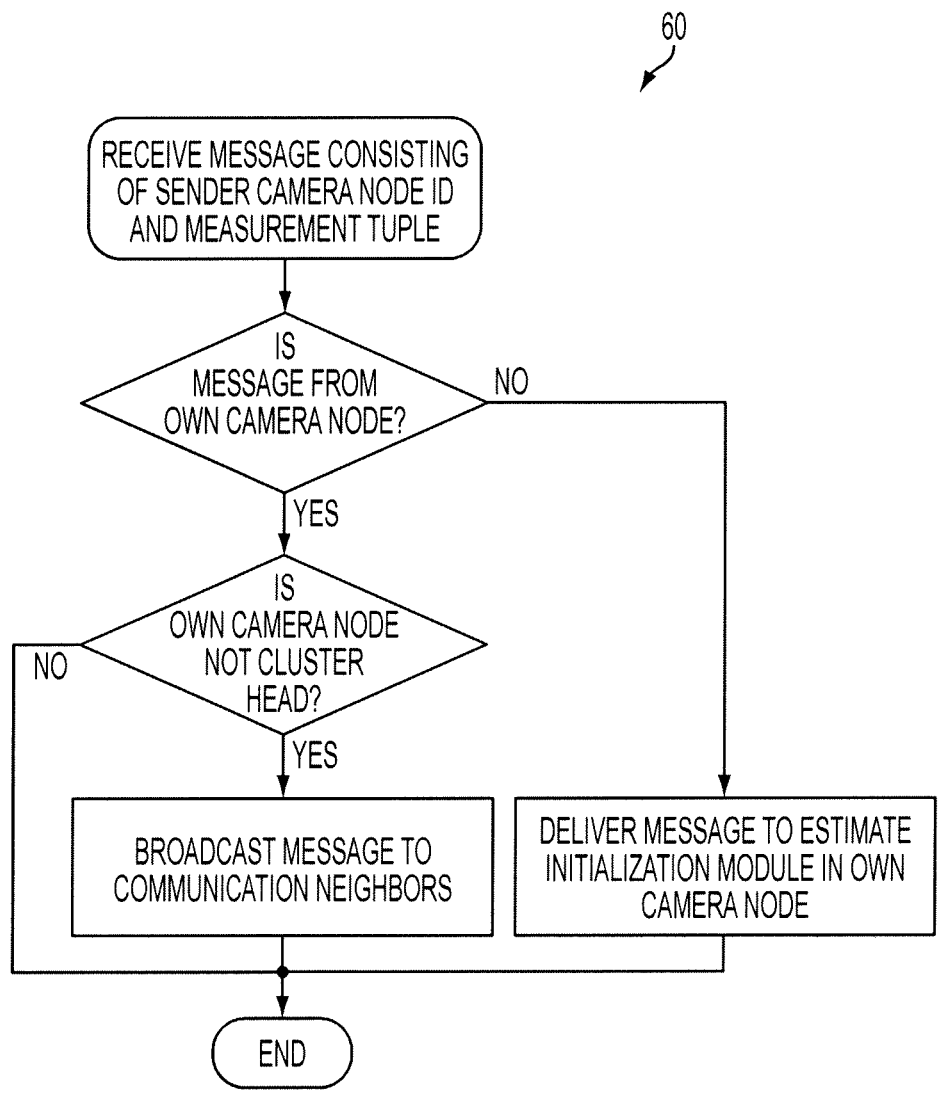
FIG. 15 illustrates one embodiment of a process performed by one of the functional modules of FIG. 7.
Figure 16:
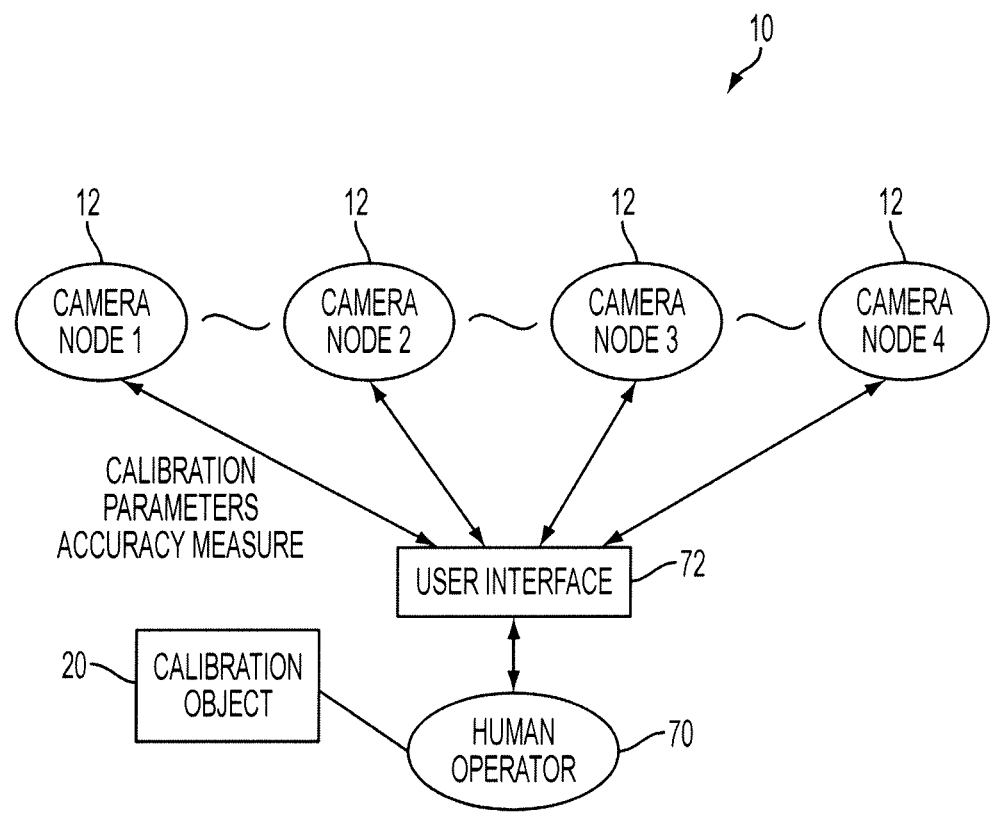
FIG. 16 illustrates an exemplary network including four camera nodes communicating with a user interface about the accuracy of their estimated calibration parameters.

In the second illustrative embodiment, all the camera nodes 12 that belong to a cluster acquire information about the calibration object 20. After the cluster is formed, each member of the cluster computes the image coordinates $m_j^i$ of the distinctive features 22, 24 of the calibration object 20 using the measurement sensing module 40. The corresponding measurement tuples $z_j^i = (m_j^i, t_j^i)$ are then aggregated at the cluster head using the measurement exchange module 42. Where the cluster has been formed based on the features of the calibration object 20, there is no need to include the calibration description vector $(d_j^i)$ in the measurement tuples. The cluster head stores these received measurements, as well as its own local measurements, until the calibration object 20 leaves its field of view and the role of the cluster head is assigned to a different camera node 12. Algorithm 7, named Measurement Exchange: Cluster-Based ( ) summarizes an illustrative cluster-based measurement exchange process 60 that may performed by the measurement exchange module 42 of each camera node 12 to implement the distributed local calibration process in the second illustrative embodiment (instead of the process 52, described above). FIG. 15 presents the Algorithm 7 in a flowchart form.

---
Algorithm 7 (Process 60).
---
Measurement Exchange: Cluster-Based ( )
    If a message n = $(i_n, z_j^{in})$ is received, then
        If the message is from own camera node, then
            If own camera node is not cluster head then
                Broadcast the message n = $(i_n, z_j^{in})$ to communication neighbors.
            End if -continued Algorithm 7 (Process 60).

```
        Else
            Deliver the message to estimate initialization module in
                own camera node.
        End if
    End if
```

When a cluster head leaves an active cluster, it then performs the estimate initialization process 54 and the estimate integration process 58. In the second illustrative embodiment, such a camera node 12 uses the measurements generated by its own measurement sensing module 40 and the corresponding measurements received by its own measurement exchange module 42 from the other cluster members to compute its relative position parameters $p^{i,k}$ with respect to these cluster members according to a local calibration procedure, substantially similar to process 54 described above. New parameter estimates, parameter estimates computed by neighboring camera nodes 12, and global reference indexes may be integrated according to a recursive estimation procedure, substantially similar to process 58 described above. Algorithm 8, named Cluster-Based-Calibration ( ), summarizes a complete cluster-based calibration procedure according the second illustrative embodiment.

Algorithm 8

```
Cluster-Based-Calibration ( )
    While 1
        Measurement-Sensing ( )                          //calls Algorithm 1
        If Measurement-Exchange: Cluster-Based           //calls Algorithm 7
        ( ) receives a message then
            If Estimate-Initialization ( ) receives      //calls Algorithm 3
            a message then
                If Estimate-Exchange( ) receives         //calls Algorithm 4
                a message then
                    Estimate-Integration( )              //calls Algorithm 5
                End if
            End if
        End if
    End while
```

The third illustrative embodiment of the systems and methods for calibrating a large network of directional sensors, according to the present disclosure, further includes a procedure for computing the calibration accuracy of each camera node 12 in the network 10. This procedure may be used in conjunction with either the first or second illustrative embodiments, described above. In this embodiment, whenever the estimate integration module 48 (shown in FIG. 7) produces an updated estimate of the camera calibration parameters, the camera node 12 determines whether its estimated calibration parameters have achieved a predetermined level of accuracy.

In the third illustrative embodiment, this predetermined level of accuracy is met when only a relatively small improvement in the estimated calibration parameters is achieved between two consecutive estimates produced by the estimate integration module 48. In other words, if the calibration parameters estimated by a camera node 12 after acquiring new information (and recursively refining its calibration parameters) are very similar to the previously estimated calibration parameters, the camera node 12 may conclude that no further improvement may be expected from acquiring additional information and the calibration of that particular camera node may be concluded. One illustrative evaluation criterion, with iteration indices represented by t−1 (previous iteration index) and t (current iteration index), may be expressed as:

$$\sum_{k=1}^{|V^i|} \|p_{t-1}^{i,k} - p_t^{i,k}\| \leq \varepsilon. \quad (16)$$

During this accuracy evaluation procedure (whenever a new estimate is produced), the camera node 12 may compute the total difference between the currently estimated parameters with respect to its neighbors ($p_t^{i,k}$) and the previously estimated parameters ($p_{t-1}^{i,k}$) and compare this total difference to a predefined threshold ($\varepsilon$). It will be appreciated that other evaluation criterion may used to determine whether a given level of accuracy had been achieved by a camera node 12, in other embodiments. Furthermore, while the third embodiment involves the performance of the accuracy evaluation procedure by each camera node 12, it is also contemplated that each camera node 12 may transmit information to a user interface 72, which may then perform some or all of the accuracy evaluation procedure.

One advantage of this illustrative embodiment is that the accuracy evaluation step allows each individual camera node 12 to decide as to whether it has concluded its own calibration procedure. After a camera node 12 decides that its calibration achieved appropriate accuracy, it may cease to estimate new parameters, thereby saving power and computational resources. The calibration accuracy procedure also allows an interactive calibration process, as described in the fourth illustrative embodiment.

Referring generally now to FIGS. 16-21, the fourth illustrative embodiment of the systems and methods for calibrating a large network of directional sensors, according to the present disclosure, utilizes a user interface to provide feedback regarding the calibration process. An exemplary system, shown in FIG. 16, includes a network 10 of camera nodes 12, a calibration object 20 (both substantially similar to FIG. 1), and a user interface 72 to provide information regarding the calibration process to a human operator 70 (who generally also controls the placement and/or movement of the calibration object 20). The user interface 72 may be any type of computing device (e.g., a personal computer, a workstation, a laptop computer, a handheld computer, a mobile internet device, a cellular phone, a personal data assistant, et cetera). The user interface 72 is illustratively configured to communicate (e.g., wirelessly) with the communication module 14 of each camera node 12, individually and independently, when the user interface 72 is within the communication range of that camera node 12. Among other information, each camera node 12 may transmit a value or determination related to the accuracy of that camera node's calibration parameters to the user interface 72.

Figure 17:
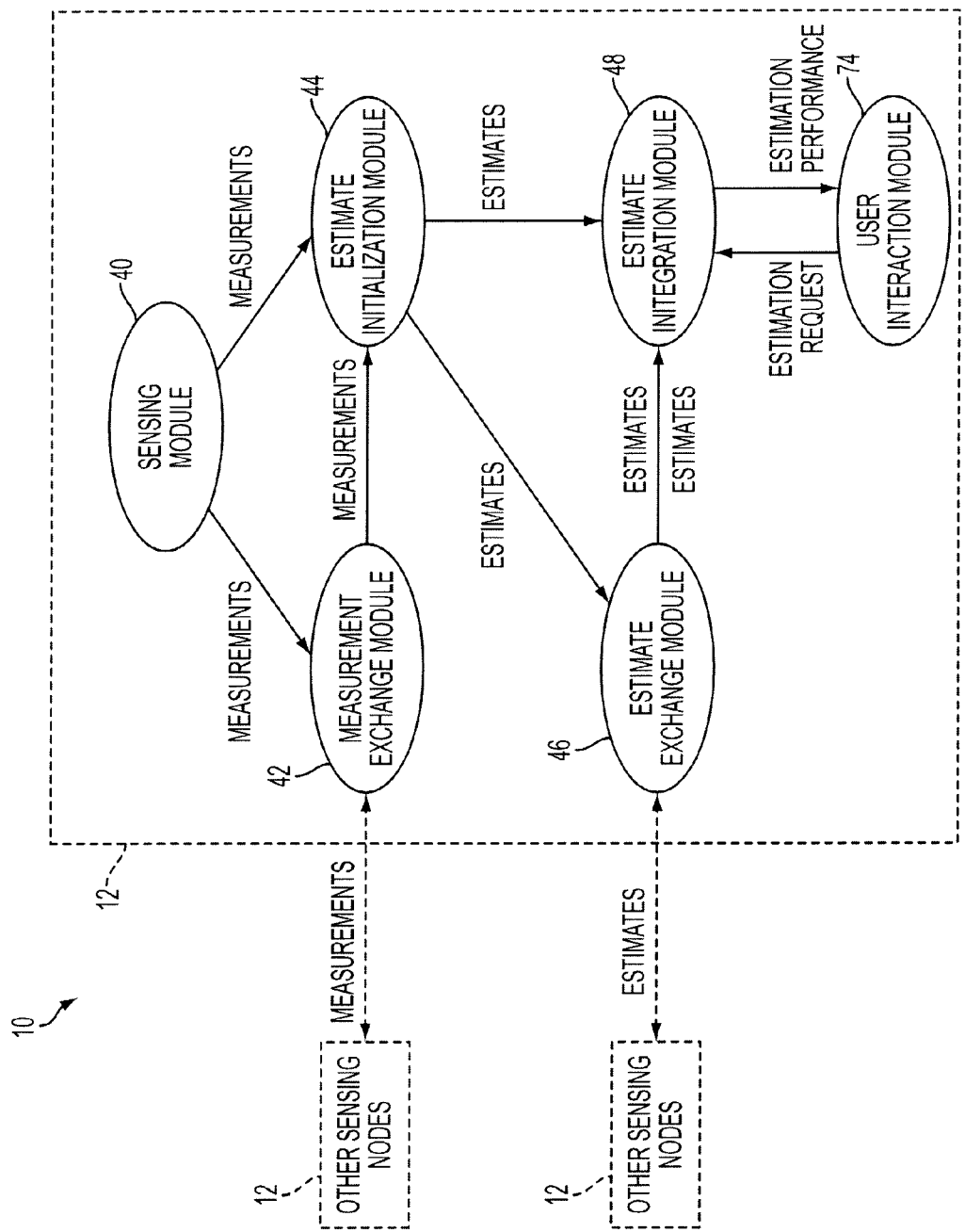
FIG. 17 illustrates another embodiment of the functional modules of a camera node.

The camera nodes 12 in the fourth illustrative embodiment include similar modules 40-48 to those described above with reference to FIG. 7, but further include a user interaction module 74, as illustrated in FIG. 17. The function of the user interaction module is to communicate with the user interface 72 to receive instructions regarding the calibration of the network 10 and to provide information regarding the calibration performance of one or more camera nodes 12 to the human operator 70. In some embodiments, this information may include the calibration accuracy computed for the camera node 12 by the estimate integration module 48, or some indication thereof. The process 80 performed by the user interaction module 74, in conjunction with the other module 40-48 of the camera node 12, is presented as a flowchart in FIG. 18. This interactive calibration process 80 of the fourth embodiment allows the camera nodes 12 of the network 10 to provide calibration-related feedback to the human operator 70. As described in more detail below, operator 70 may utilize this feedback information to better control the placement of calibration object 20 to provide additional useful information to the camera nodes 12 (thereby creating a closed-loop system) and to determine when the calibration is completed.

Figure 19:
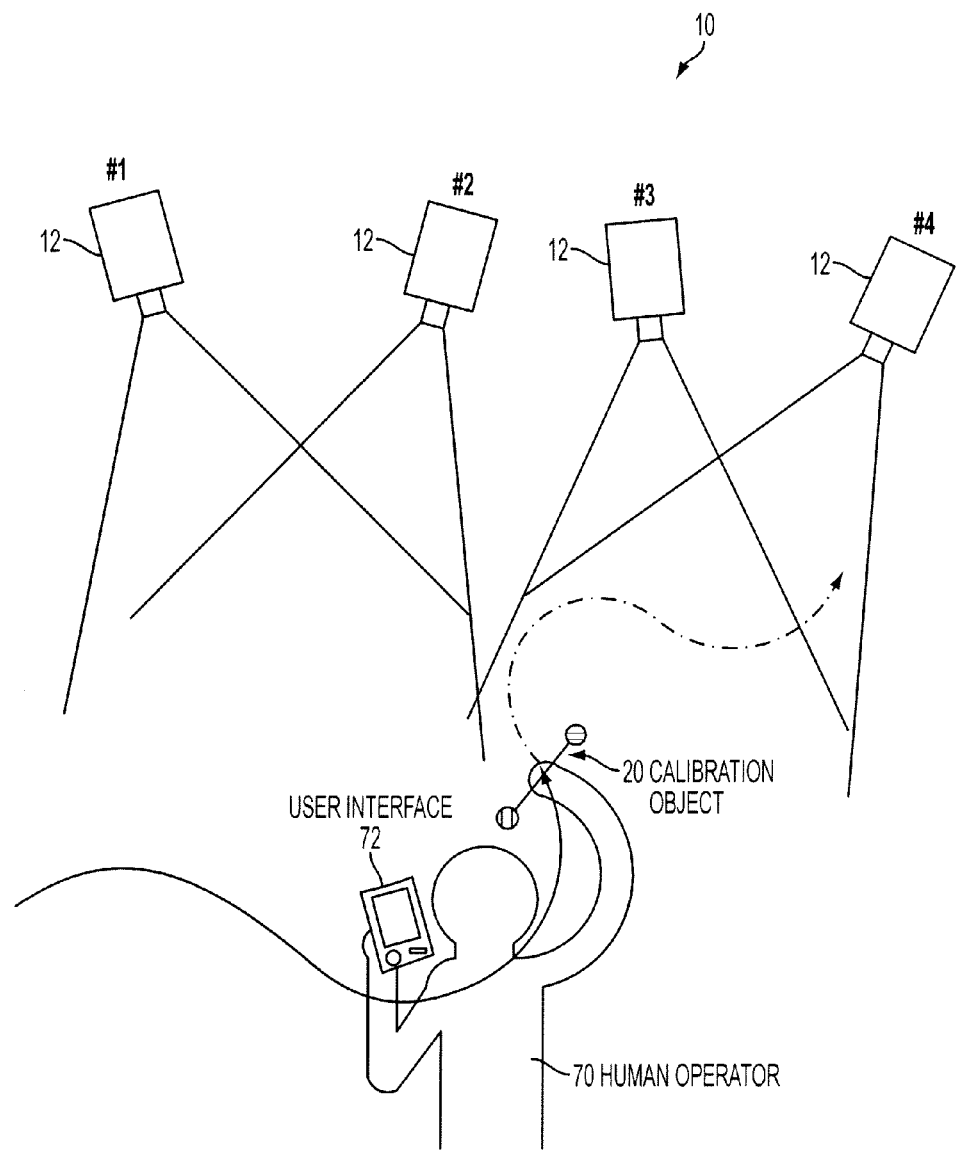
FIG. 19 is a simplified diagram illustrating an embodiment of the network of FIG. 16 in which a human operator physically moves the calibration object of FIG. 2A throughout the network.
Figure 20:
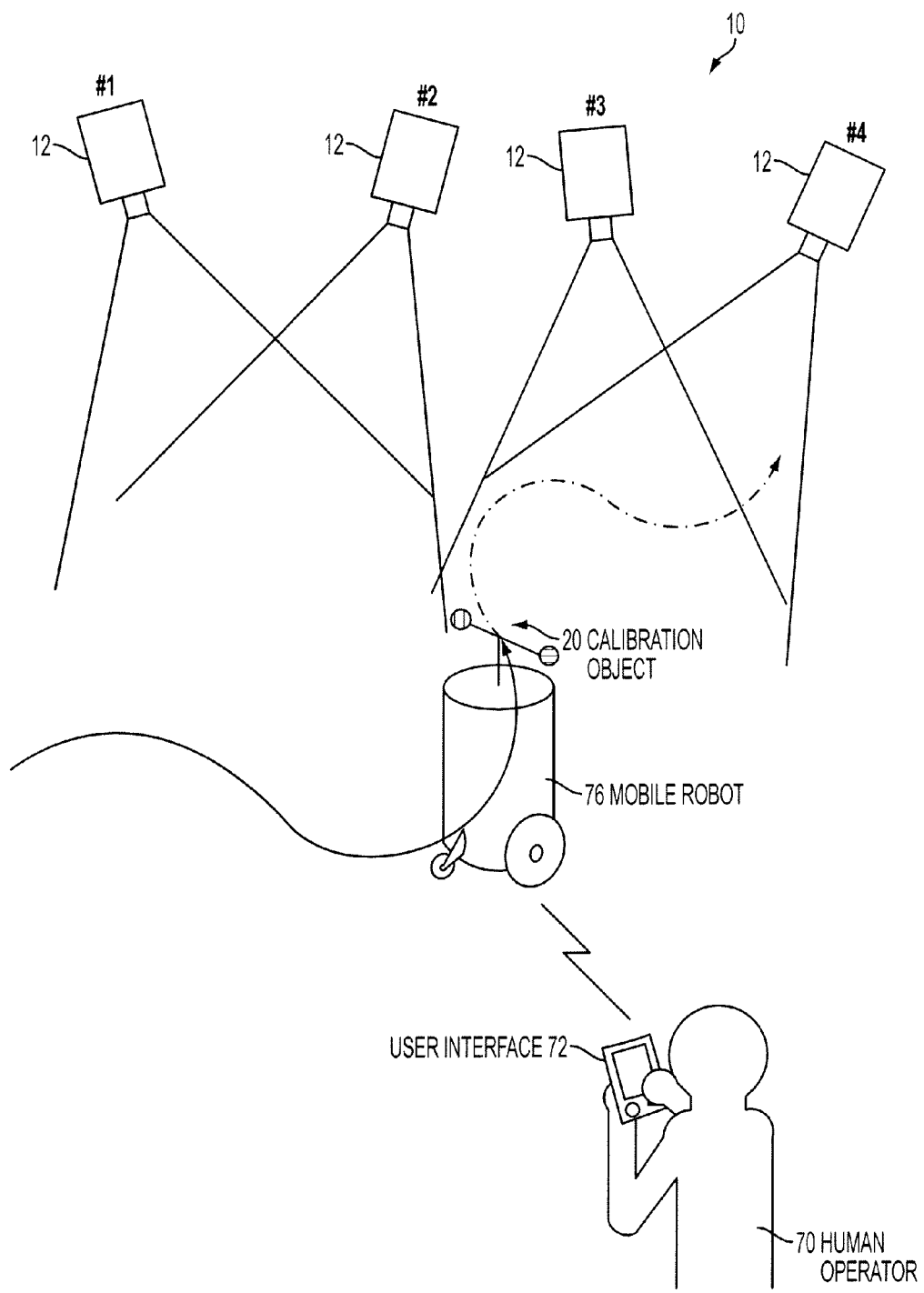
FIG. 20 is a simplified diagram illustrating another embodiment of the network of FIG. 16 in which a mobile robotic device moves the calibration object of FIG. 2A throughout the network.

The process 80 begins with step 82 in which the calibration object 20 is placed in the viewing area(s) of one or more camera nodes 12, such that the one or more camera nodes 12 may capture one or more images of the calibration object 20. In some embodiments, the calibration object 20 may be physically carried by a human operator 70 throughout the network 10, as illustrated in FIG. 19. In other embodiments, the calibration object 20 may be carried by a mobile robotic device 76 throughout the network 10, as illustrated in FIG. 20. The movement of such a mobile robotic device 76 may be controlled by the operator 70, using conventional controls, to cause the mobile robotic device 76 to move to a desired location within the network 10, such that the calibration object 20 is placed in the viewing area(s) of one or more camera nodes 12. It is also contemplated that the network 10 may automatically decide where the mobile robotic device 76 is most needed at a given time and send commands to move the device 76 to that region. In other embodiments, the calibration object 20 may be applied to other objects, such as an automobile while it moves with visibly identifiable features (e.g., headlights).

After the step 82, the process 80 proceeds to the distributed calibration process. During the distributed calibration process in step 84, each camera node 12 performs calibration procedures according to either the first, second, or third embodiments to produce calibration parameters for the camera node 12 and any neighboring camera nodes 12 in its communication range. As described above, the calibration process generally involves each camera node 12 capturing one or more images of the calibration object 20 when it is present, processing these images using the measurement sensing module 40, sharing measurements using the measurement exchange module 42, determining an initial pairwise estimate of the calibration parameters using the estimate initialization module 44, sharing initial estimates using the estimate exchange module 46, and recursively updating the estimated calibration parameters by integrating calibration parameters using the estimate integration module 48.

After the step 84, the process 80 proceeds to step 86 in which the camera node 12 determines whether its estimated calibration parameters have achieved a desired level of accuracy. In some embodiments, the process 80 may remain idle until the user interaction module 74 receives a request for an accuracy computation from the user interface 72. In step 86, the user interaction module 74 sends an accuracy computation request to the estimate integration module 48. The estimate integration module 48 then evaluates the calibration accuracy of the camera node 12 and returns this value to the user interaction module 74. In some embodiments of step 86, the user interaction module 74 will then determine whether a predetermined level of accuracy has been achieved. In other embodiments of step 86, the user interaction module 74 sends the accuracy computation to the user interface, so that the human operator 70 may determine whether he is satisfied with the accuracy level. In such embodiments, the user interface 72 will transmit the response from the operator 70 back to the user interaction module 74 for evaluation.

Figure 18:
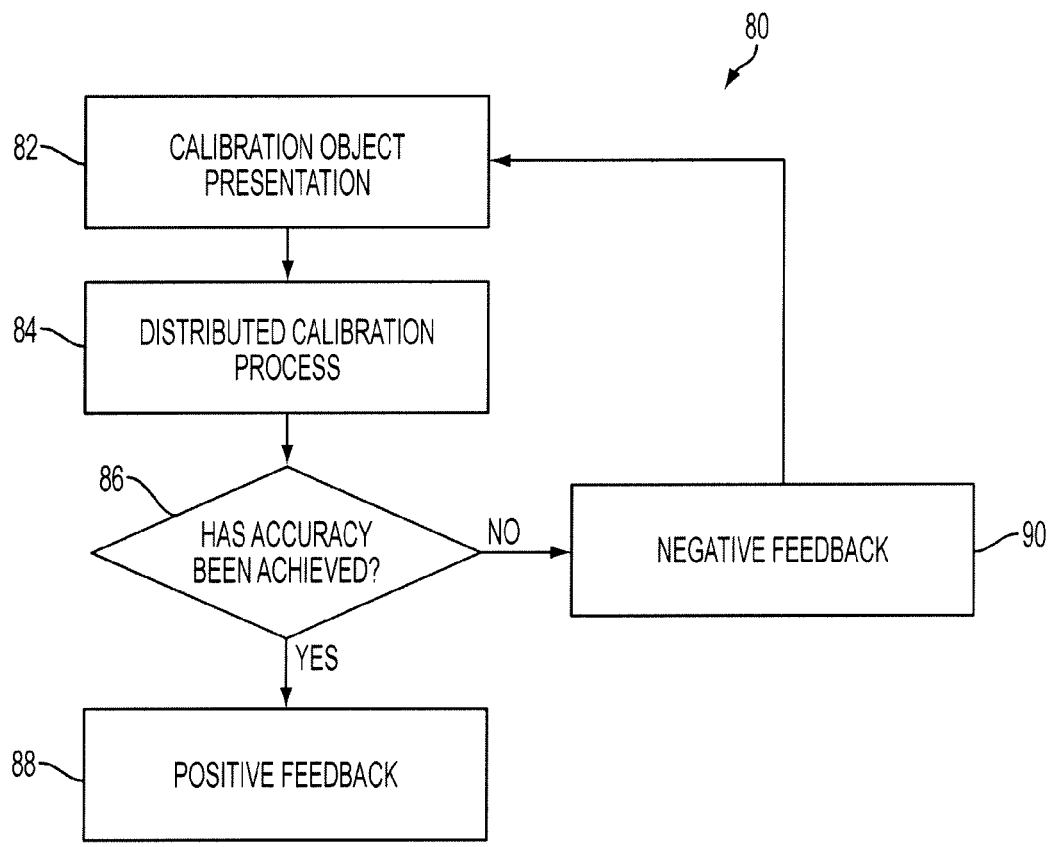
FIG. 18 illustrates one embodiment of a process performed by the functional modules of FIG. 17.

After step 86, the process 80 proceeds to either the positive feedback step 88 or the negative feedback step 90. Where a camera node 12 determines during step 86 that it has achieved the desired level of accuracy (either internally or via feedback from the user interface 72), the process 80 proceeds to positive feedback step 88. In step 88, the camera node 12 will send an appropriate signal to the user interface 72 to cause the user interface 72 to inform the operator 70 that the interactive calibration process 80 with respect to that camera node 12 is complete. Where a camera node 12 determines that its has not achieved the desired level of accuracy, however, the process 80 proceeds to negative feedback step 90. In step 90, the camera node 12 will send an appropriate signal to the user interface 72 to cause the user interface 72 to inform the operator 70 that the interactive calibration process 80 with respect to that camera node 12 should continue. This negative feedback in step 90 allows the user to move the calibration object 20 into the viewing area of the insufficiently calibrated camera node 12. This activity is illustrated in FIG. 18 as a return to step 82. The process 80 is iterated until the desired accuracy of the calibration is achieved in each camera node 12.

Figure 21:
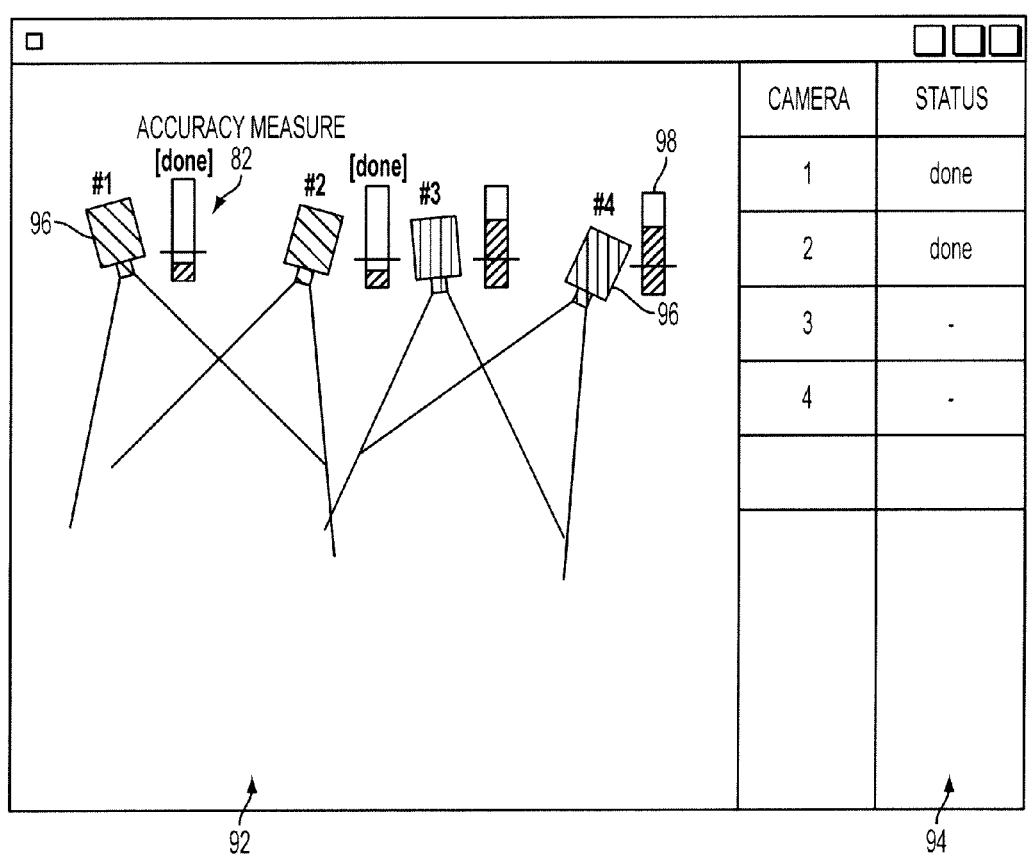
FIG. 21 illustrates one embodiment of the user interface of FIG. 16 having a graphical display portion and a textual display portion.

An exemplary user interface 72 that may be used with the fourth illustrative embodiment of the present disclosure is shown in FIG. 21. The user interface 72 generally includes a graphical display portion 92 and a textual display portion 94. It is contemplated that, in other embodiments, the user interface 72 may have only one of these display portions 92, 94 or include further display portions or elements. The textual display portion 94 of the user interface 72 is embodied as a performance table including a column listing the camera node ID and a column listing the calibration status of each camera node 12. For instance, the user interface 72 of FIG. 21 indicates that the calibration of camera node "1" and camera node "2" is complete with status "done" (i.e., step 88 of process 80), while the calibration of camera node "3" and camera node "4" is not complete with status "-" (i.e., step 90 of process 80).

The graphical display portion 92 of the user interface 72 shown in FIG. 21 is also operable to display whether each camera node 12 has achieved a predetermined measure of accuracy (e.g., by changing the color of an associated camera icon 96), but may convey further information to an operator 70 of the user interface 72. In addition to the binary "complete"/"not complete" determination, each camera icon 96 may have an associated accuracy icon 98 which indicates the relative level of accuracy (or, conversely, error) corresponding to a particular camera node 12. In the exemplary user interface 72 of FIG. 21, the accuracy icon 98 is embodied as a variable height bar with a horizontal line indicating the desired level of accuracy. Such an accuracy icon 98 allows an operator 70 to know which camera nodes 12 require further calibration information. Furthermore, the camera nodes 12 may also send messages to the user interface 72 containing their respective calibration parameters. In such embodiments, this data may allow the user interface 72 to dynamically reconstruct the relative positions and orientations of each of the camera nodes 12 in the network 10 with respect to the global coordinate frame in the graphical display portion 92, as shown in FIG. 21.

The user interface 72 of the fourth illustrative embodiment (as well as the calibration cycle stopping rule) may be used with any of the first, second, or third illustrative embodiments of the calibration systems and methods described above. The user interface 72 may provide a reduction in the time necessary for calibration, as the system communicates to a user when appropriate conditions have been achieved and allows the calibration process to be completed more efficiently. The fourth illustrative embodiment also allows for reduction in the amount of movement required by the calibration object 20 (i.e., away from sufficiently calibrated areas and toward new or underexplored areas of the network 10, to improve the calibration of camera nodes in those areas). Finally, the user interface 72 may also allow the monitoring of calibration parameters via the internet, if the network 10 is so connected.

As described in this embodiment, the user interaction allows the operator 70 to evaluate the calibration performance, while images for the calibration are being captured. In other words, the operator 70 can monitor how accurately and how satisfactorily the calibration of multiple camera nodes 12 in an environment is being executed. For example, if any of the camera nodes 12 does not have sufficiently accurate estimated camera parameters, the operator 70 can monitor it online and can update the camera parameters by moving the calibration object 20 in the vicinity of such camera nodes 12 and by further integrating the estimates. In addition, the operator 70 can obtain the performance level of the calibration by looking at the accuracy measure for each camera node 12 online. The operator 70 can stop moving the calibration object when the user notices through the user interface 72 that a sufficient accuracy has been achieved. Therefore, the user interface 72 of this fourth illustrative embodiment may reduce the time required for the overall calibration, even for a distributed camera network 10 comprising a large number of camera nodes 12.

The fifth illustrative embodiment of the systems and methods for calibrating a large network of directional sensors, according to the present disclosure, includes a modified estimate initialization module 48 that performs a bundle adjustment. The function of this modified estimate initialization module 48 is to estimate the pairwise camera parameters within the communication neighbors using a bundle adjustment procedure. After an initial calibration is obtained, bundle adjustment allows for the refinement of the calibration parameters by performing a minimization of the error between the observed image points and the estimated positions of the image points according to the calibration parameters estimated. This minimization may be carried out simultaneously with respect to the camera calibration parameters and the observed points. Since this procedure corresponds to computing a maximum likelihood estimate of the distribution of the parameters (assuming all uncertainties are Gaussian), the covariance matrices of the parameters, as explained above, are used.

Figure 22:
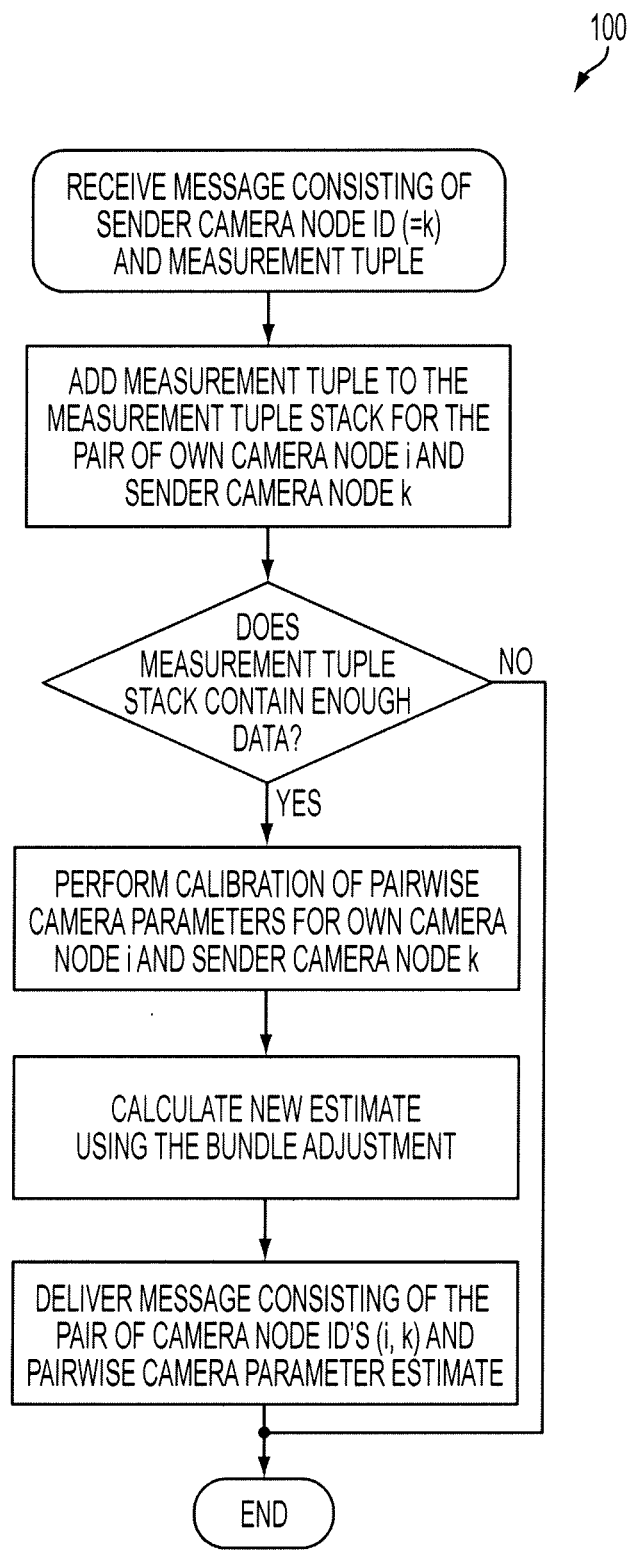
FIG. 22 illustrates a modified form of the process of FIG. 10, including a bundle adjustment procedure.
Figure 23:
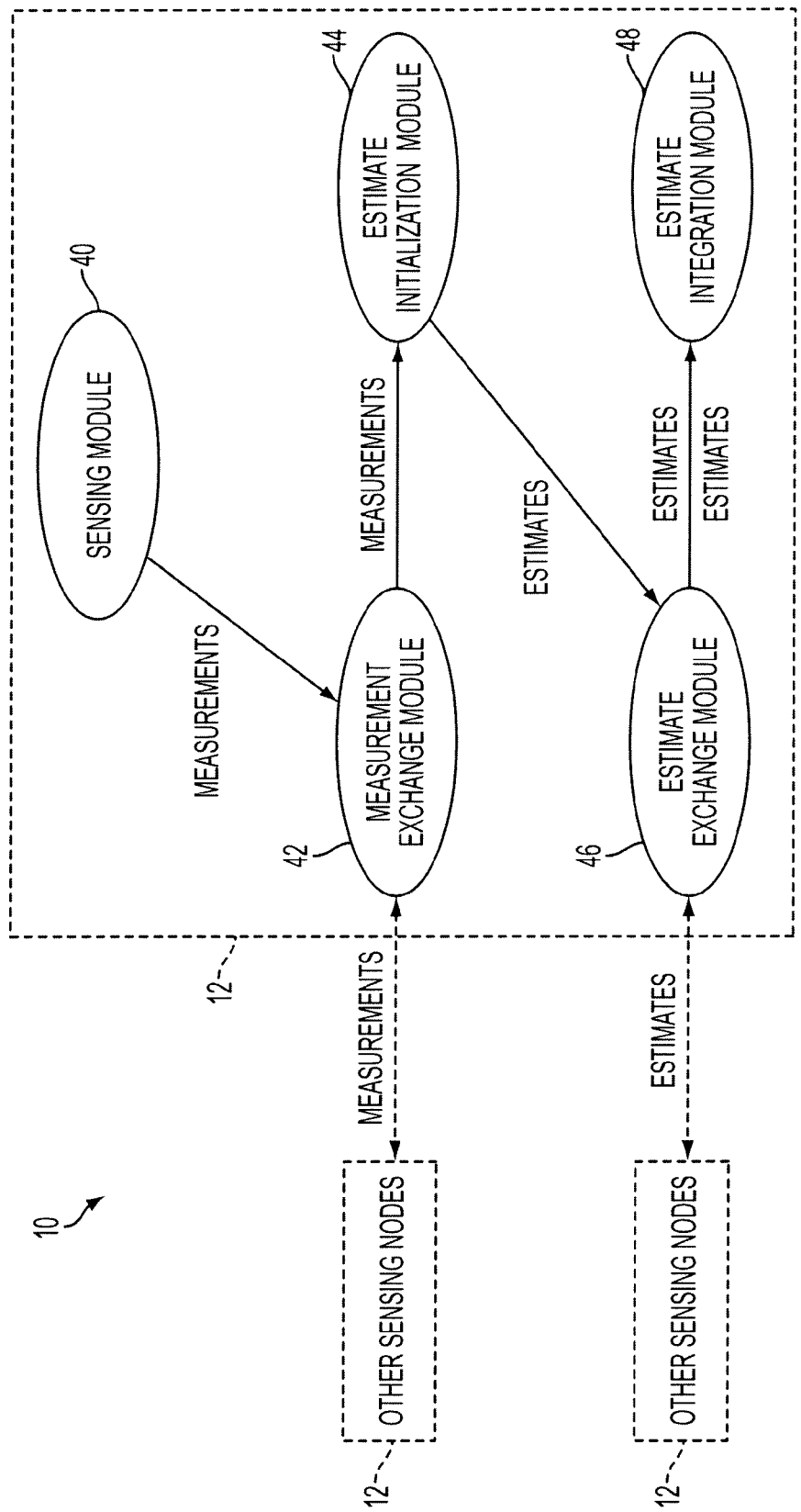
FIG. 23 illustrates another embodiment of the functional modules of a camera node.

The process 100 performed by the modified estimate integration module 48 is summarized in Algorithm 9 below, named Estimate-Integration-with-Bundle-Adjustment( ) and is also presented as a flowchart in FIG. 22. After calibration parameters $p^{i,k}$ are obtained for all neighbors $k \in V^i$ and the corresponding covariance matrices are obtained, a non-linear optimization scheme (i.e., a bundle adjustment) may be used to optimize the camera parameters using all available data. The function h may be used to describe the reprojection of the 3D coordinates $M_j$ onto the image plane of a camera with calibration parameters p (i.e., $m=h(p,M)$). The bundle adjustment scheme operates to minimize the reprojection error with respect to all 3D points and camera parameters, which may be expressed as:

$$\min_{p^{i,k}, M_j} \sum_{k=1}^{|V^i|} \sum_{j=1}^{|C^{i,k}|} \|h(p^{i,k}, M_j) - m_j^k\|, \quad (17)$$

and may be achieved by iteratively solving the weighted normal equations:

$$J^T \Sigma_m^{-1} J \delta = J^T \Sigma_m^{-1} \epsilon \quad (18),$$

where J is the Jacobian matrix of h, $\Sigma_m$ is the covariance matrix of the measurement vector, $\delta$ is the update of the parameter vector sought in each iteration, and $\epsilon$ is the reprojection error vector. The inverse covariance matrix of the calibration parameters can be obtained from the corresponding diagonal term of the matrix $J^T \Sigma_m^{-1} J$ at the end of the iteration. While efficient implementation schemes for this large nonlinear optimization problem are available, the computational requirements may be too intensive for some types of camera-based sensors, and some embodiments may not utilize the bundle adjustment scheme. By adding the bundle adjustment to estimate the pairwise camera parameters, however, the fifth illustrative embodiment provides higher calibration accuracy rather than the first illustrative embodiment.

---
Algorithm 9 (Process 100)
---
Estimate-Initialization-with-Bundle-Adjustment ( )
    If a message consisting of sender camera node ID (=k) and
    measurement tuple is received, then
        Add the measurement tuple to the measurement tuple stack $C^{i,k}$
        for the pair of own cameran node i and sender camera node
        k.
        If the measurement tuple stack $C^{i,k}$ contains enough data, then
            Perform calibration of pairwise camera parameters ($p^{i,k}, \Sigma^{i,k}$)
            for own camera node i and sender camera node k.
            Calculate new estimate ($\tilde{p}^{i,k}, \tilde{\Sigma}^{i,k}$) using the bundle adjustment
            for ($p^{i,k}, \Sigma^{i,k}, C^{i,k}$).
            Deliver a message consisting of the pair of camera node
            ID's (i,k) and pairwise camera parameter estimate
            ($\tilde{p}^{i,k}, \tilde{\Sigma}^{i,k}$) to estimate exchange module and estimate
            integration module in own camera node.
        End if
    End if
---

Figure 24:
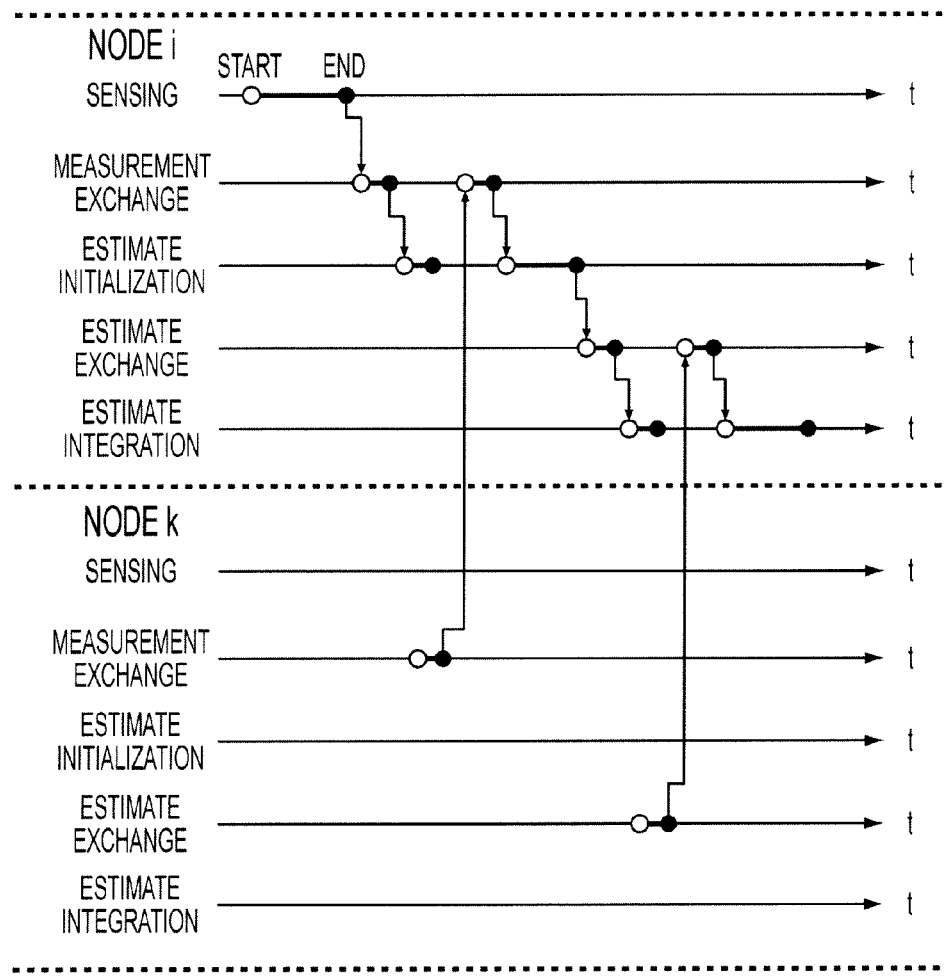
FIG. 24 is a simplified diagram illustrating one embodiment of the operations performed by the modules of FIG. 23.

The sixth illustrative embodiment of the systems and methods for calibrating a large network of directional sensors, according to the present disclosure, includes a modified module structure, in which the measurement exchange module 42 and the estimate exchange module 46 are responsible for controlling the flow of "measurements" and "estimates," respectively, within the sensor node 12. In particular, measurements generated in the measurement sensing module 40 are always sent to the measurement exchange module 42, which is responsible for forwarding the measurements to the estimate initialization module 44 or to the measurement exchange modules 42 of other sensor nodes 12. Likewise, estimates generated or updated in the estimate initialization module 44 and the estimate integration module 48 are always sent to the estimate exchange module 46. In the sixth illustrative embodiment, the processes 50-56 (described above with reference to the first illustrative embodiment) are modified, as illustrated in Algorithms 10-13 below. FIG. 24 illustrates the interactions of a camera node i and a camera node k, operating according to the sixth illustrative embodiment. As can be seen in FIG. 24 (contrasted with FIG. 14), the communication of a measurement occurs through the measurement exchange module 42 and the communication of an estimate occurs through the estimate exchange module 46. One advantage of this embodiments is simpler functionality and an easier implementation than the first illustrative embodiment. In particular, the measurement sensing module 40 only delivers its measurements to one location and the estimate initialization module 44 only delivers its estimates to one location.

---
Algorithm 10 (modified Process 50)
---

Measurement-Sensing ( )
    Capture a raw image.
    Search for a calibration object in the raw image.
    If a calibration object (j) is detected, then
        Characterize the calibration object in the image and create a
            measurement tuple $z_j^i = (m_j^i, d_j^i, t_j^i)$.
        Deliver a message consisting of the camera node ID (i) and the
            measurement tuple $z_j^i$ to measurement exchange module in
            own camera node.
    End if ---
Algorithm 11 (modified Process 52)
---

Measurement-Exchange-by-Peer-to-Peer ( )
    If a message $n = (i_n, z_j^{in})$ is received, then
        Deliver the message to estimate initialization module in own
            camera node.
        If the message is from own camera node, then
            Broadcast the message $m = (i, z_j^i)$ to communication
                neighbors.
        End if
    End if ---
Algorithm 12 (modified Process 54)
---

Estimate-Initialization ( )
    If a message consisting of sender camera node ID (=k) and
        measurement tuple is received, then
        Add the measurement tuple to the measurement tuple stack $C^{i,k}$
            for the pair of own camera node i and the sender camera
            node k.
        If the measurement tuple stack $C^{i,k}$ contains enough data, then
            Perform calibration of pairwise camera parameters $(p^{i,k}, \Sigma^{i,k})$
                for own camera node i and the sender camera node k.
            Deliver a message consisting of the pair of camera node
                ID's (i,k) and the pairwise camera parameter estimate
                $(p^{i,k}, \Sigma^{i,k})$ to two estimate exchange module in own
                camera node.
        End if
    End if ---
Algorithm 13 (modified Process 56)
---

Estimate-Exchange( )
    If a message $n = (i_n, k, p^{in,k}, \Sigma^{in,k})$ consisting of the pair of camera node
        ID's $(i_n, k)$ and a pairwise camera parameter estimate is
        received, then
        Deliver the message to estimate integration module in own
            camera node.
        If the message is from own camera node, then
            Broadcast the message $n = (i, k, p^{i,k}, \Sigma^{i,k})$ to communication
                neighbors.
        End if
    End if While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. For instance, the systems and methods of the present disclosure may be applied to various environments including both indoor environments and outdoor environments. In the indoor environments, the camera nodes may be mounted on walls, ceilings, or any other portion of public and private buildings or vehicles. In the outdoor environments, the camera nodes may be mounted on any part of streets, roads, stations, harbors, airports, and campuses, etcetera.

There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present invention and fall within the spirit and scope of the present disclosure as defined by the appended claims.

What is claimed is:

1. A method comprising:
sensing a calibration object with a plurality of directional sensor nodes;
exchanging measurement data regarding the calibration object between the plurality of directional sensor nodes;
estimating an initial set of calibration parameters in each of the plurality of directional sensor nodes, each of the plurality of directional sensor nodes estimating its initial set of calibration parameters in response to the measurement data which that directional sensor node sent to other directional sensor nodes of the plurality of directional sensor nodes and in response to the exchanged measurement data which that directional sensor node received from other directional sensor nodes of the plurality of directional sensor nodes;
exchanging the initial sets of calibration parameters between the plurality of directional sensor nodes; and
estimating an updated set of calibration parameters in each of the plurality of directional sensor nodes, each of the plurality of directional sensor nodes estimating its updated set of calibration parameters in response to the initial set of calibration parameters which that directional sensor node sent to other directional sensor nodes of the plurality of directional sensor nodes and in response to the exchanged initial sets of calibration parameters which that directional sensor node received from other directional sensor nodes of the plurality of directional sensor nodes.

2. The method of claim 1, wherein the steps of estimating the initial set of calibration parameters and estimating the updated set of calibration parameters are performed in a distributed manner by each of the plurality of directional sensor nodes.

3. The method of claim 1, wherein sensing the calibration object with the plurality of directional sensor nodes comprises simultaneously observing a calibration object having at least two distinctive features with a plurality of camera nodes.

4. The method of claim 1, wherein exchanging measurement data regarding the calibration object comprises each of the plurality of directional sensor nodes broadcasting measurement data to and receiving measurement data from all of its one-hop communication neighbors.

5. The method of claim 1, wherein exchanging measurement data regarding the calibration object comprises forming a dynamic cluster of directional sensor nodes and aggregating measurement data at a cluster head of the dynamic cluster.

6. The method of claim 5, wherein the cluster head performs the step of estimating an initial set of calibration parameters for each of the plurality of directional sensor nodes in the dynamic cluster after the cluster head leaves the dynamic cluster.

7. The method of claim 1, wherein estimating the initial set of calibration parameters for each of the plurality of directional sensor nodes comprises determining a relative position vector and a corresponding covariance between each pair of directional sensor nodes having eight or more corresponding data points regarding the calibration object among the measurement data.

8. The method of claim 1, wherein exchanging the initial sets of calibration parameters comprises each of the plurality of directional sensor nodes broadcasting its set of calibration parameters to and receiving a set of calibration parameters from all of its one-hop communication neighbors.

9. The method of claim 1, wherein estimating the updated set of calibration parameters for each of the plurality of directional sensor nodes comprises refining the initial set of calibration parameters for each of the plurality of directional sensor nodes using recursive least squares.

10. The method of claim 1, further comprising adjusting the updated set of calibration parameters for each of the plurality of directional sensor nodes to conform to a global coordinate frame.

11. The method of claim 10, wherein adjusting the updated set of calibration parameters for each of the plurality of directional sensor nodes comprises dynamically aligning local coordinate frames of the plurality of directional sensor nodes to one another.

12. The method of claim 1, further comprising refining the updated sets of calibration parameters using a bundle adjustment scheme.

13. The method of claim 1, further comprising performing the steps of exchanging the initial sets of calibration parameters and estimating an updated set of calibration parameters recursively until the respective directional sensor node achieves a predetermined level of calibration accuracy.

14. The method of claim 13, wherein the respective directional sensor node achieves a predetermined level of calibration accuracy when the difference between two consecutively estimated sets of calibration parameters is less than a predetermined value.

15. The method of claim 13, further comprising reporting to an operator that the respective directional sensor node has achieved a predetermined level of calibration accuracy.

16. The method of claim 15, further comprising placing the calibration object in a viewing area of a directional sensor node that has not yet achieved the predetermined level of calibration accuracy.

17. One or more tangible, non-transitory machine-readable media comprising a plurality of instructions that, in response to being executed, result in a plurality of directional sensor nodes:
sensing a calibration object;
exchanging measurement data regarding the calibration object between the plurality of directional sensor nodes;
estimating an initial set of calibration parameters in each of the plurality of directional sensor nodes, each of the plurality of directional sensor nodes estimating its initial set of calibration parameters in response to the measurement data which that directional sensor node sent to other directional sensor nodes of the plurality of directional sensor nodes and in response to the exchanged measurement data which that directional sensor node received from other directional sensor nodes of the plurality of directional sensor nodes;
exchanging the initial sets of calibration parameters between the plurality of directional sensor nodes; and
estimating an updated set of calibration parameters in each of the plurality of directional sensor nodes, each of the plurality of directional sensor nodes estimating its updated set of calibration parameters in response to the initial set of calibration parameters which that directional sensor node sent to other directional sensor nodes of the plurality of directional sensor nodes and in response to the exchanged initial sets of calibration parameters which that directional sensor node received from other directional sensor nodes of the plurality of directional sensor nodes.

18. The one or more tangible, non-transitory machine-readable media of claim 17, wherein the steps of estimating the initial set of calibration parameters and estimating the updated set of calibration parameters are performed in a distributed manner by each of the plurality of directional sensor nodes.

19. The one or more tangible, non-transitory machine-readable media of claim 17, wherein the plurality of instructions, in response to being executed, result in a plurality of camera nodes observing a calibration object having at least two distinctive features.

20. The one or more tangible, non-transitory machine-readable media of claim 17, wherein exchanging measurement data regarding the calibration object comprises each of the plurality of directional sensor nodes broadcasting measurement data to and receiving measurement data from all of its one-hop communication neighbors.

21. The one or more tangible, non-transitory machine-readable media of claim 17, wherein exchanging measurement data regarding the calibration object comprises forming a dynamic cluster of directional sensor nodes and aggregating measurement data at a cluster head of the dynamic cluster.

22. The one or more tangible, non-transitory machine-readable media of claim 21, wherein the cluster head performs the step of estimating an initial set of calibration parameters for each of the plurality of directional sensor nodes in the dynamic cluster after the cluster head leaves the dynamic cluster.

23. The one or more tangible, non-transitory machine-readable media of claim 17, wherein estimating the initial set of calibration parameters for each of the plurality of directional sensor nodes comprises determining a relative position vector and a corresponding covariance between each pair of directional sensor nodes having eight or more corresponding data points regarding the calibration object among the measurement data.

24. The one or more tangible, non-transitory machine-readable media of claim 17, wherein exchanging the initial sets of calibration parameters comprises each of the plurality of directional sensor nodes broadcasting its set of calibration parameters to and receiving a set of calibration parameters from all of its one-hop communication neighbors.

25. The one or more tangible, non-transitory machine-readable media of claim 17, wherein estimating the updated set of calibration parameters for each of the plurality of directional sensor nodes comprises refining the initial set of calibration parameters for each of the plurality of directional sensor nodes using recursive least squares.

26. The one or more tangible, non-transitory machine-readable media of claim 17, wherein the plurality of instructions, in response to being executed, further result in the plurality of directional sensor nodes adjusting the updated set of calibration parameters for each of the plurality of directional sensor nodes to conform to a global coordinate frame.

27. The one or more tangible, non-transitory machine-readable media of claim 26, wherein adjusting the updated set of calibration parameters for each of the plurality of directional sensor nodes comprises dynamically aligning local coordinate frames of the plurality of directional sensor nodes to one another.

28. The one or more tangible, non-transitory machine-readable media of claim 17, wherein the plurality of instructions, in response to being executed, further result in the plurality of directional sensor nodes refining the updated sets of calibration parameters using a bundle adjustment scheme.

29. The one or more tangible, non-transitory machine-readable media of claim 17, wherein the plurality of instructions, in response to being executed, further result in the plurality of directional sensor nodes performing the steps of exchanging the initial sets of calibration parameters and estimating an updated set of calibration parameters recursively until the respective directional sensor node achieves a predetermined level of calibration accuracy.

30. The one or more tangible, non-transitory machine-readable media of claim 29, wherein the respective directional sensor node achieves a predetermined level of calibration accuracy when the difference between two consecutively estimated sets of calibration parameters is less than a predetermined value.

31. The one or more tangible, non-transitory machine-readable media of claim 29, wherein the plurality of instructions, in response to being executed, further result in the plurality of directional sensor nodes reporting to an operator that the respective directional sensor node has achieved a predetermined level of calibration accuracy.

32. The one or more tangible, non-transitory machine-readable media of claim 31, wherein the plurality of instructions, in response to being executed, further result in the plurality of directional sensor nodes placing the calibration object in a viewing area of a directional sensor node that has not yet achieved the predetermined level of calibration accuracy.

* * * * *